US006539602B1

(12) United States Patent
Ozawa et al.

(10) Patent No.: US 6,539,602 B1
(45) Date of Patent: Apr. 1, 2003

(54) METHOD OF REPAIRING COKE OVEN

(75) Inventors: Tatsuya Ozawa, Chiba (JP); Nozomu Tamura, Chiba (JP); Tetsuro Uchida, Chiba (JP); Nobuya Kamide, Tokyo (JP); Yuzuru Osaki, Fukuoka (JP); Yoshiharu Sato, Fukuoka (JP)

(73) Assignees: Kawasaki Steel Corporation (JP); Otto Corporation (JP)

( * ) Notice: Subject to any disclaimer, the term of this patent is extended or adjusted under 35 U.S.C. 154(b) by 0 days.

(21) Appl. No.: 09/468,453

(22) Filed: Dec. 21, 1999

(30) Foreign Application Priority Data

Jul. 13, 1999 (JP) .......................................... 11-199187
Jul. 5, 1999 (JP) .......................................... 11-190067
Jul. 5, 1999 (JP) .......................................... 11-190068

(51) Int. Cl.[7] ............................ B23P 6/00; E04G 23/00

(52) U.S. Cl. ................................ 29/402.11; 29/402.03; 29/402.08; 29/402.09; 29/426.1; 29/464; 52/514; 52/218

(58) Field of Search ......................... 29/402.03, 402.01, 29/402.08, 402.09, 402.11, 426.1, 426.4, 428, 445, 469, 464; 52/514, 218, 127.1, 127.2, 745.03, 745.02, 745.05, 745.09, 745.1, 122.1, 745.08, 125.1; 432/76

(56) References Cited

U.S. PATENT DOCUMENTS 2,472,221 A * 6/1949 Malthouse ................... 52/314
2,573,195 A * 10/1951 Gunderson ................... 432/76
2,969,884 A * 1/1961 Salmi ......................... 414/586
3,458,641 A * 7/1969 Perucchetti .................. 373/75
3,646,722 A * 3/1972 Salmi ...................... 52/745.08
4,059,885 A * 11/1977 Oldengott ................ 29/402.09
4,085,495 A * 4/1978 Hebert ........................ 29/469
4,102,038 A * 7/1978 Eagan ......................... 29/462
4,364,798 A * 12/1982 Costa .......................... 52/743
4,373,244 A * 2/1983 Mertens et al. .......... 29/402.08
4,452,749 A * 6/1984 Kolvek et al. ................ 264/30
4,545,860 A * 10/1985 Lyskawa et al. .............. 52/566
5,060,428 A * 10/1991 Arthur et al. ................ 52/745
5,423,152 A * 6/1995 Kolvek ........................ 52/218
5,597,452 A * 1/1997 Hippe et al. ............. 29/402.18
6,066,236 A * 5/2000 Gilroy ........................ 202/138
6,088,986 A * 7/2000 DiGate ........................ 52/514
6,282,863 B1 * 9/2001 Christian et al. .......... 52/747.1

FOREIGN PATENT DOCUMENTS

DE 2122729 B * 7/1974
EP 0 065 328 * 11/1982

* cited by examiner

*Primary Examiner*—Gregory M. Vidovich
*Assistant Examiner*—Marc Jimenez
(74) *Attorney, Agent, or Firm*—Schnader Harrison Segal & Lewis LLP

(57) ABSTRACT

Repairing a chamber coke oven by heat-insulating a repair space in the oven, dividing a brick wall in a portion to be repaired into a plurality of layers stacked one above another, dismantling and removing the brick wall in the repaired portion, and carrying refractory assemblies into the oven one by one, each of the refractory assemblies being manufactured outside the oven by combining a plurality of bricks together correspond in shape to each of the stacked layers in one-to-one relation, thereby building the brick wall in the repaired portion with the refractory assemblies. A damaged combustion chamber brick wall of the coke oven near an oven opening can be repaired with high efficiency.

12 Claims, 21 Drawing Sheets

CONVENTIONAL

METHOD OF REPAIRING COKE OVEN

BACKGROUND OF THE INVENTION

1. Field of the Invention

The present invention relates to a method of repairing a chamber type coke oven. Specifically, the present invention relates to a method of repairing damaged walls of combustion chambers near oven openings of a coke oven with high efficiency. It further relates to a method of relaying bricks to build up coke oven walls, to a method of heat-insulating a part of a coke oven during repair of a brick wall therein, and to an apparatus for taking bricks into a coke oven for repair. More particularly, the present invention relates to a coke oven repairing method which is applicable even to a coke oven having combustion chambers with a complicated brick structure, such as a Carl Still coke oven.

2. Description of the Related Art

Generally, as shown in FIG. 1, a coke oven includes a regenerator 9 in its lower portion, and a plurality of coking chambers 2 and combustion chambers 4 arranged alternately side by side in its upper portion, thereby constituting an oven battery. Coal is charged into the coking chambers 2 from a charging car 51 traveling over the coke oven, and is carbonized under heat applied from the combustion chambers 4 on both sides. After opening a door 8 of each coking chamber 2, the carbonized coal, i.e., coke, is pushed out from the coking chamber 2 into a quenching car 53 via a guide car 54 by a pushing machine 52, followed by being transported to a red coke quenching facility (not shown) in the quenching car 53.

The regenerator 9 and the combustion chambers 4 are constructed using bricks. Inside the regenerator 9 and the combustion chambers 4, there are formed passages through which flow the fuel gas, air and combustion exhaust gas generated when the fuel gas mixes with air and burning. In particular, the combustion chambers 4 are each structured by laying bricks in a combined manner to form those passages. Outer wall surfaces of the combustion chamber 4 serve also as brick wall surfaces of the adjacent coking chambers 2. Thus, each coking chamber 2 is a space surrounded by the outer wall surfaces of the two adjacent combustion chambers 4, the door 8 at the side near the pushing machine 52, and a door 10 at the side near the guide car 54.

For carbonizing coal in the coking chambers 2 into homogeneous coke, the temperature in the coking chambers 2 needs to be kept as uniform as possible. To that end, various types of structures have been proposed relating to the passages for the fuel gas, air and the combustion exhaust gas which is formed in the regenerators 9 and the combustion chambers 4.

FIG. 2 is a perspective sectional view of Carl Still type coke ovens, as an example having two-divided combustion chambers and having horizontal flues at the top of each row of combustion chambers. In a two-divided type coke oven, the combustion chamber 4 and the regenerator 9 are each divided into two sides: the pushing-machine located side (machine side: hereinafter abbreviated to M/S) 17 and the guide-car located side (coke side: hereinafter abbreviated to C/S) 16, both of the sides being coupled via a horizontal flue 14 at the top of the combustion chamber 4. The direction in which the M/S and C/S are interconnected is referred to as the longitudinal direction of the oven; it is indicated by arrow 18 in FIG. 2. The direction along which the combustion chambers and the coking chamber are alternately arranged side by side is referred to as the transverse direction of the oven; it is indicated by arrow 19 in FIG. 2.

Still referring to FIG. 2, fuel gas 61 and air 62 for combustion are both supplied from below the regenerator 9 of the C/S flow through the passages in the regenerator 9 for preheating, and then flow upwardly through the combustion chamber 4. Within the combustion chamber 4, the fuel gas passages and the air passages have openings formed in multiple stages for communication with vertical flues 11. The openings in the fuel gas passages are referred to as gas ports, and the openings in the air passages are referred to as air ports. The fuel gas 61 and the air 62 are mixed with each other in the vertical flues 11, whereupon the fuel gas burns. The fuel gas passages and the air passages in the combustion chamber are each called a multistage burner duct 12. Flows of the combustion exhaust gas generated in the vertical flues 11 join together in the horizontal flue 14, advance in the longitudinal direction of the oven, and reach the M/S of the combustion chamber. Then, the combustion exhaust gas flows downward from the upper horizontal flue 14 into vertical flues 11 of the M/S, goes into multistage burner ducts 12 through gas ports and air ports in a reversed direction as compared to that in the C/S, and passes the regenerator 9, followed by being exhausted from a smoke-stack 20. After continuing the above combustion process for 20 to 30 minutes, the fuel gas 61 and the air 62 are supplied from the M/S oppositely. The combustion exhaust gas flows from the M/S to the C/S, and is then exhausted. As a result of repeating the above two combustion process alternately, the temperatures in both the C/S and M/S of the combustion chamber are kept uniform.

In this way, the coke oven of FIG. 2 is operated so that the temperature is kept as uniform as possible throughout the oven. At the time of discharging the produced coke to the outside of the oven, however, the doors at both ends are opened and the coke is pushed out by the pushing machine as described above. Therefore, open air flows into the oven, and the oven walls near the doors are subjected to abrupt rising and falling of temperature. It is also inevitable that the wall surfaces of the coking chambers are abraded by the coke being pushed out. Accordingly, the use of the coke oven for a long period of time often gives rise to significant damage of the oven walls, particularly near the doors. In the case of serious damage, the oven is repaired by hot-relaying of bricks to form the oven walls.

Heretofore, the wall of a coking chamber has been repaired as follows.

First, two adjacent coking chambers are emptied. Then, combustion is ceased in one combustion chamber formed in an oven wall to be repaired and in two combustion chambers adjacent to the former. Simultaneously, a heat-insulating material is installed so as to surround an area covering from the boundary between a rebuilt (repaired) portion and a not-repaired portion of the one combustion chamber to the oven openings between the two combustion chambers. The reason for surrounding the rebuilt portion with the heat-insulating material is to prevent temperature drop of bricks in the not-repaired portion of the one combustion chamber and bricks in the two adjacent combustion chambers. Another reason is to accelerate cooling of bricks in the rebuilt portion at the same time. The temperature in the working space is thus lowered to such a level as to allow the start of brick relaying work.

After supporting ceiling bricks of the rebuilt portion by hanging hardware to prevent those bricks from dropping, the brick wall in the rebuilt portion is dismantled and oven fastening hardware is removed. The all serving as a partition between the two adjacent coking chambers is partly dismantled. Subsequently, in the positions left open after dismantling, new bricks are manually laid one by one to restore the wall, and the oven fastening hardware is installed.

In laying bricks one by one, the thickness of joints between bricks laid in the repaired portion and the positions of bricks fitted to each other are adjusted. For adjustment, the dimensions of the space left open after dismantling the brick wall to be rebuilt are measured, and the dimensions of a rebuilt brick wall in a condition after the oven temperature has been completely raised are calculated, taking into account the three-dimensional position of the not-repaired portion of the brick wall of the combustion chamber, and the thermal expansion of the bricks used. As a result, a smooth and continuous wall surface is formed between the not-repaired portion and the repaired portion of the brick wall of the combustion chamber. In the work for pushing out coke after the start of operation of a coke oven, therefore, the frictional resistance between the coke and the wall surface can be reduced.

With the above repairing method, however, because bricks are laid and bonded one by one in a narrow oven space, the repairing work takes a long time. Also, an extended shutdown time of the facility brings about a remarkable reduction of production. Further, the oven temperature in the repaired portion is lowered, but it cannot be fully lowered down to the temperature of open air. In other words, the work of rebuilding the oven brick wall imposes a great load upon the workers.

To solve the above-mentioned problem, Japanese Unexamined Patent Publication No. 4-213388 discloses a method of repairing a damaged portion of a heating wall of a coke oven by using large-sized module bricks each molded into a one-piece structure. The module brick is molded so as to provide flues and coking chamber wall surfaces in the integral form which constitute a combustion chamber of the coke oven, and is manufactured prior to the relaying work. The disclosed method employs, as a unit brick, the module brick having a larger size than the conventional unit brick. Accordingly, the disclosed method can shorten the time required for the repairing work in the coke oven, and reduce the working load. Further, the oven shutdown time during the repairing work can also be shortened. It is thus possible to suppress a reduction rate of coke production, and simultaneously to cut the working time.

However, the module brick is large in both size and weight. A hoist or the like is necessary to lay such a large-sized brick to a predetermined position in the coke oven But it is not easy to fixedly install a hoist beam because the ceilings, walls, etc. of combustion chambers and coking chambers of the coke oven are constructed of bricks. Also, even if a hoist beam could be installed to extend from a position above a brick-laid portion of the combustion chamber to the outside of the oven, the hoist beam extended to the outside of the oven may interfere with any other traveling car or machine traveling outside the oven.

Another problem with the use of module bricks is a difficulty in precisely laying the module bricks to rebuild the brick wall. When building a coke oven in a conventional way, manually laid bricks each usually have a height of 130 cm and a weight of not more than 10 kg, at maximum a height of 250 cm and a weight of 25 kg. In the case of using such a brick, the vertical load imposed on mortar (bond) applied as a horizontal joint is relatively small, ie., in the range of 0.025–0.06 kg/cm$^2$. Therefore, even when mortar prepared to have a relatively small consistency (according to JIS (Japanese Industrial Standards R2506: consistency of mortar) is used, the bricks can be laid one above another strictly as designed with a joint thickness of 3–5 mm. In other words, the bricks can be precisely stacked up in a short time after applying the mortar. In the case of laying bricks having a larger height and a greater weight, however, the vertical load imposed on the applied joint mortar is increased. Consequently, when mortar suitable for short-time work is employed, the applied joint mortar may be overly depressed and shrunk before developing its own strength, thus causing difficulty in precisely laying the bricks one above another.

Further, in a coke oven having combustion chambers with a complicated brick built-up structure, such as a Carl Still coke oven, it is very difficult to form module bricks themselves.

Module bricks for use in a Koppers coke oven (disclosed in, e.g., the above-cited Japanese Unexamined Patent Publication No. 4-213388), for example, can be manufactured with ease. In the Koppers coke oven, a flue formed in the combustion chamber extends straight from the lower end of the combustion chamber to the upper end thereof, and then returns to the lower end after turning around at the upper end. A large number of flues having such a configuration are arranged in parallel to form the combustion chamber. Thus, the module bricks for use in the Koppers type coke oven each have such a simple shape that vertical bores are formed through a large-sized brick. It is therefore not so difficult to mold those module bricks.

In a Carl Still coke oven, however, the combustion chamber has three types of passages, i.e., gas passages, air passages and flues, all of which extend from the lower end of the combustion chamber to the upper end thereof. Further, at several points within a brick wall of the combustion chamber in the vertical direction, oblique openings are formed to extend from the gas passage and the air passage to the corresponding flue. When trying to form the combustion chamber in the Carl Still coke oven using module bricks, therefore, not only the vertical passage bores but also the oblique openings must be provided in the wall brick. Stated otherwise, the problem arises that a large-sized module brick to be manufactured, has a complicated internal structure and that dimensional accuracy is reduced during firing of the module brick.

Module bricks are molded by pouring a refractory material in molds and firing the material. Therefore, a large number of module bricks are manufactured beforehand to have a certain configuration and dimensions as per designed, and are used in repairing a coke oven. In general, the brick wall surfaces of the coke oven are deformed due to the use for many years, and particularly vertical surfaces are often inclined. In view of such a deformation, surfaces of a rebuilt brick wall are adjusted at joints when bricks are laid one above another. In the case of laying module bricks one above another, the number of joints in the vertical direction is smaller than the case of stacking ordinary unit bricks one by one. For that reason, when the module bricks are laid one above another, an amount of adjustment to be made at each joint is increased, discontinuous steps are inevitably left at the joints, and a smooth wall surface cannot be formed as a whole. If an uneven wall surface is left unchanged, the frictional resistance between the wall surface and coke after the start of operation of the coke oven would be increased and the period until next repair would be shortened. To avoid such problems, discontinuous steps in the wall surface must be cut with a cutter or a sander to smooth the wall surface after build-up of the module bricks. This work however prolongs the total time required for the bricklaying work at high temperatures, and offsets the advantage from employing the module bricks.

Further, in a two-divided type coke oven having a horizontal flue at the top of a combustion chamber, hot air cannot be perfectly blocked off just by covering wall surfaces of both adjacent coking chambers with heat-insulating materials. More specifically, because the top horizontal flue is extended throughout the combustion chamber in the longitudinal direction of the oven, hot air is blown off from vertical flues in the unrepaired portion of a brick wall through the top horizontal flue. In addition, the rebuilt portion of the brick wall is also communicated with an underlying regenerator through multistage burner ducts and gas ports at the bottom ends of the vertical flues. Accordingly, as dismantling of bricks progresses, there occurs a blowoff of hot air through gas ports and air ports of the multistage burner ducts and the gas ports at the bottom ends of the vertical flues. No method of effectively preventing such a blowoff of hot air for positive heat insulation has yet been proposed.

Moreover, to prevent brick scraps generated during dismantling of the bricks from scattering through openings in communication with the regenerator, those openings must be covered to keep the brick scrap positively from dropping into the regenerator through the openings.

An object of the present invention is to provide a method of repairing a coke oven with which coke oven walls deformed in various ways due to use for many years, can be precisely repaired with high efficiency. More particularly, the present invention provides a coke oven repair method which can shorten the working time under a high temperature environment, can reduce the load of brick relaying work, and can precisely repair damaged brick walls even when repairing a complicated coke oven. The present invention also provides a concrete heat-insulating method capable of improving the working environment. It further provides a method of preventing brick scraps from dropping down to undesired locations. It also relates to an apparatus for taking bricks into a coke oven.

SUMMARY OF THE INVENTION

To achieve the above objects, the present invention provides a method of repairing a coke oven and an apparatus for talking bricks into a coke oven as follows.

More specifically, in hot-relaying/-repairing a part of a combustion chamber brick wall of a coke oven, the method comprises the steps of heat-insulating a repair space in the oven, dividing a brick wall in a portion to be repaired into a plurality of layers stacked one above another, dismantling and removing the brick wall in the repaired portion, and carrying refractory assemblies into the oven one by one, each of the refractory assemblies being manufactured outside the oven by combining a plurality of bricks together to assume a shape corresponding to each of the stacked layers in one-to-one relation, thereby building the brick wall in the repaired portion with the refractory assemblies. Also, in the method of repairing a coke oven, the refractory assemblies are carried into the oven by using an apparatus for taking bricks into the oven, the apparatus comprising an in-oven beam fixed to ceiling hanging hardware and installed through eyeholes formed in the combustion chamber ceiling of the oven, an ex-oven beam extending from the in-oven beam to the outside of the oven, a suspension device for lifting up and down a suspended load and moving along the in-oven beam and the ex-oven beam, and a brick gripping device suspended from the suspension device. Further, in the repair method, the coke oven is of the 2-divided type having a horizontal flue at the top of a combustion chamber, and the repair space in the oven is heat insulated, for example, by closing upper end openings of two or more vertical flues with a heat-insulating material, the vertical flues being located in an unrepaired portion adjacent to a repaired portion, and by blocking off the horizontal flue over its full cross-section.

DESCRIPTION OF THE PREFERRED EMBODIMENTS

Figure 1:
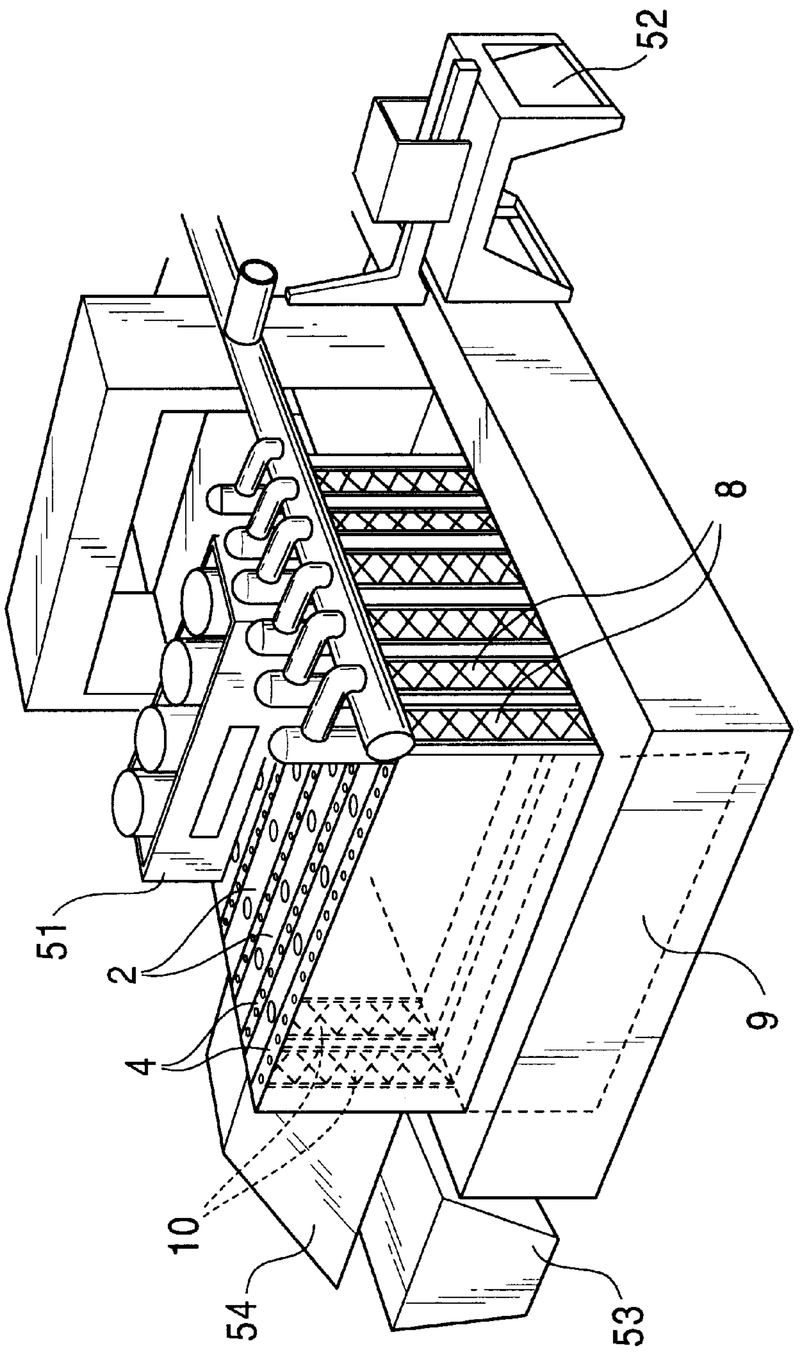
FIG. 1 is an explanatory view showing a facility layout of a general coke oven.
Figure 2:
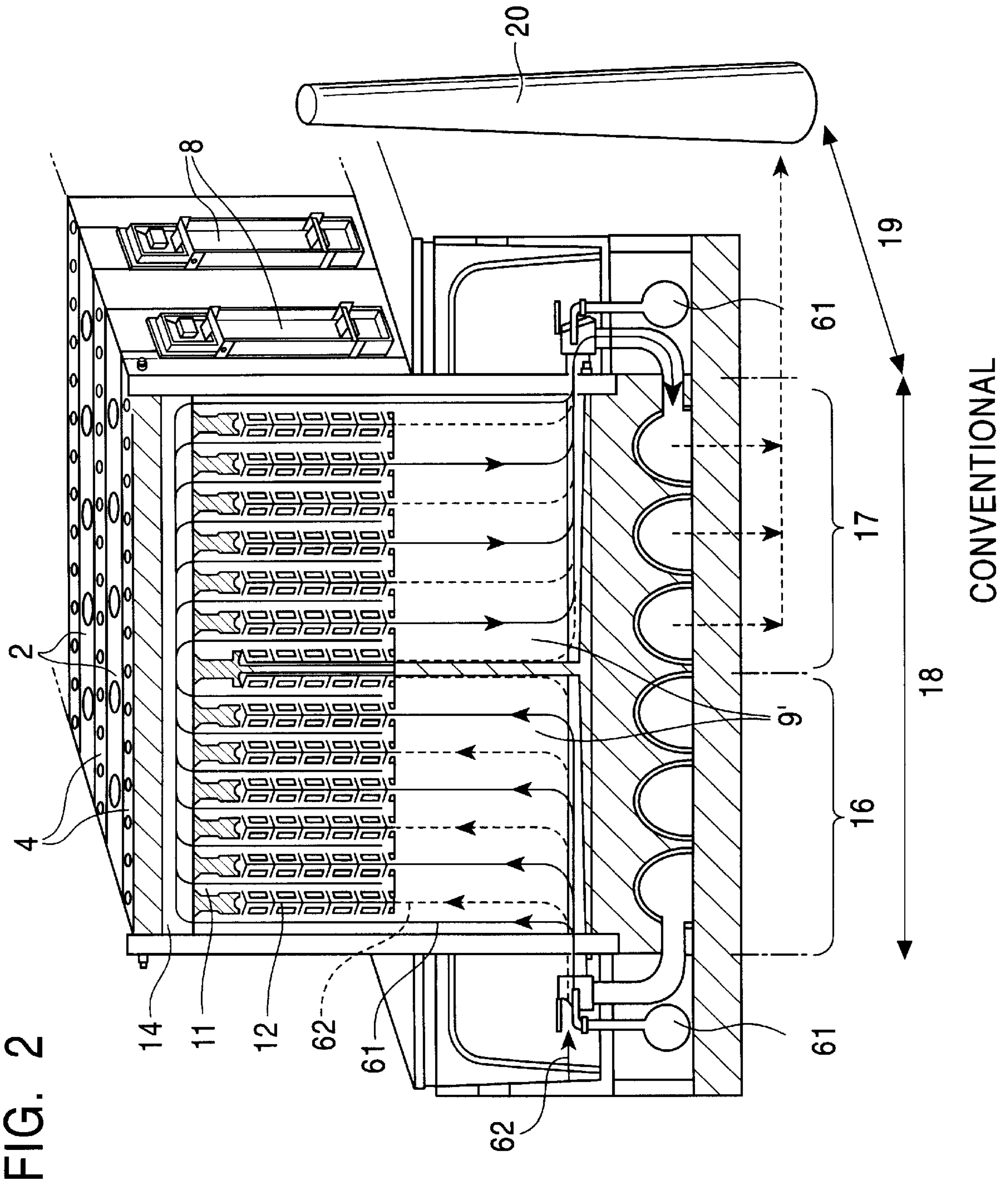
FIG. 2 is an explanatory perspective sectional view of a part of a chamber type coke oven, showing gas flows in a regenerator and a combustion chamber.

A brick wall in a portion of the coke oven to be repaired is divided into a plurality of layers stacked one above another, refractory assemblies are manufactured outside the oven by combining a plurality of bricks together to have a shape in coincidence with the shapes. of the stacked layers in one-to-one relation, and the brick wall in the repaired portion is dismantled and removed, followed by building the brick wall in the repaired portion with the refractory assemblies. With this method, surfaces of the rebuilt brick wall can be finely adjusted while obtaining improvements resulting from using the refractory assemblies, and radically improved repair can be achieved.

In the present invention, the term A refractory assembly@ means a composite refractory which is formed by combining a plurality of bricks into a large body. The plurality of bricks for use in the refractory assembly may have a larger size than conventional bricks so long as the brick size allows easy handling of the bricks. The dimensions and shape of the refractory assembly are set corresponding to those of the repaired portion of the brick wall and the remaining portion thereof In other words, the correspondence therebetween may be complete coincidence—or coincidence in a main portion thereof. Because the refractory assembly is assembled in a place located outside the oven, in a better working environment, by using unit refractories (bricks) which are easy to handle, the assembly can be precisely manufactured with ease. Also, because the brick wall is assembled by carrying each refractory assembly into the oven, the number of the refractory assemblies to be laid is reduced as compared with the case of laying individual bricks one by one Specifically, the number of steps of work for laying the bricks or the refractory assemblies, which is required in the oven to rebuild the brick wall, is reduced, the working time in the oven is shortened, and the working environment for the workers is remarkably improved Further, because the dimensions and shape of the refractory assembly are set corresponding to those of the repaired portion of the brick wall and the remaining portion thereof, uneven steps on the oven wall surfaces in the repaired portion are reduced, and an increase of frictional resistance generated between the oven wall surfaces and the coke at the time of pushing the coke out of the oven can be reduced.

In the above method of repairing a coke oven, preferably, spacers are arranged at joints between the refractory assemblies stacked one above another, and the refractory assembly of an upper stage is laid on a joint, including the spacers, applied to the refractory assembly of a lower stage. Using the spacers is suitable for achieving fine adjustment in the. repaired portion. Using the spacers is also effective in overcoming a difficulty encountered in maintaining a proper joint thickness due to the increased weight of the large-sized refractory assembly.

According to the present invention, there are several variations in the method of heat-insulating a repair space in a coke oven when an oven brick wall is repaired.

One variation is that, when hot-relaying/repairing a part of a combustion chamber brick wall of a coke oven which is of the 2-division type having a horizontal flue at the top of of the combustion chamber, upper end openings of two or more vertical flues are closed with a heat-insulating material, the vertical flues located in an unrepaired portion adjacent to the repaired portion, and the horizontal flue is blocked off over its fill cross-section. This makes it possible to prevent streams of hot air from entering the repair space from the adjacent two or more vertical flues, and to suppress heat radiation from the boundary between the repaired portion and the unrepaired portion. According to this method, prior to totally dismantling the oven brick wall in the repaired portion, a part of the oven brick wall is first dismantled, followed by blocking off gas ports at the bottom of the vertical flues locating in the repaired portion and gas ports or air ports opened at the boundary between the repaired portion and the unrepaired portion. Subsequently, bricks defining the top horizontal flue are dismantled successively from the oven opening end while heat-insulating materials are pushed into the top horizontal flue. When reaching the boundary between the top horizontal flue to be dismantled and the remaining top horizontal flue, a heat-insulating material is inserted into the remaining top horizontal flue to close upper end openings of the succeeding two or more vertical flues, and at the same time the top horizontal flue is blocked off over its full cross-section.

In another method gas ports or air ports formed in a partition of a vertical flue adjacent to the repaired portion are blocked off with heat-insulating materials. A blowoff of hot air from the gas ports and the air ports can be avoided. In addition, brick scraps can be prevented from dropping down into multistage burner ducts during the work of dismantling the bricks in the repaired portion.

Another alternative method is featured in that heat-insulating materials are installed to cover outer wall surfaces of the combustion chamber over a distance corresponding to two or three vertical flues in the not-repaired portion adjacent to the repaired portion, and the heat-insulating materials are further extended to cover areas ranging from inward ends of the heat-insulating materials in the longitudinal direction of the oven to the ends of two combustion chambers adjacent to the combustion chamber to be repaired. Heat can be prevented from entering the repair space from the outer wall surfaces of the combustion chamber covering two or three vertical flues in the unrepaired portion adjacent to the repaired portion At the same time, since the upper end openings of the two or three vertical flues are closed by the heat-insulating material, drafts through those vertical flues can be suppressed and the temperature in an area including those vertical flues can be held at a relatively low level. In other words, the temperature at the boundary between the repaired portion and the unrepaired portion can be kept at such a level as not to impede the work of repairing the brick wall. Further, by installing the heat-insulating materials in a better way, a wider space is available in the oven for the brick relaying work. When extending the heat-insulating materials to cover the areas ranging from the inward ends of the heat-insulating materials in the longitudinal direction of the oven to the ends of the two combustion chambers adjacent to the combustion chamber to be repaired, it is preferable, for example, to install the heat-insulating materials so as to cover a full cross-section of coking chambers in the transverse direction of the oven at the ends of the heat-insulating materials inward of the repaired portion in the longitudinal direction of the oven, and then cover outer wall surfaces of the two adjacent combustion chambers from the inward ends of the heat-insulating materials to the ends of the two adjacent combustion chambers.

In yet another method a depending lid is placed from above into each of multistage burner ducts, i.e., passages for fuel gas and air, the passages being exposed with progress of the work for dismantling the brick wall in the repaired portion. Because the multistage burner ducts communicate with a regenerator positioned below the combustion chamber, flows of gas and air would be impaired if brick scraps or the like were to drop into the multistage burner ducts during the dismantling work. To prevent such trouble, it is required to cover upper end openings of the multistage burner ducts in the repaired portion during the dismantling work At the start of the dismantling work, however, the multistage burner ducts are not exposed to the wall surfaces and there are no ways of effectively covering the upper end openings of the multistage burner ducts. With this method, at the time when the upper opening end of each multistage burner duct is exposed after the start of the dismantling work, the depending lid is placed in the exposed upper opening end of the multistage burner duct to prevent brick scraps from dropping into the multistage burner duct. The depending lid is preferably structured such that a support flange is rested on upper surfaces of bricks to be dismantled, and a lid member is hung from the support flange by a rod or pipe with a length corresponding to the height of two or several stages of bricks. This structure prevents brick scraps from dropping down through the multistage burner duct while the bricks are dismantled in a portion covered by the length of the rod or pipe.

In apparatus for moving bricks into a coke oven, according to the present invention. a hoist beam is provided. It has a length extending to the outside of the coke oven and comprises an ex-oven beam extending out of the oven and an in-oven beam located inside the oven. The hoist beam is fixed to lower ends of ceiling hung hardware for supporting the ceiling of the combustion chamber in the repaired portion, and the ex-oven beam is foldable and can be retracted into the oven or mounted on a carriage traveling along the oven end perpendicularly to the longitudinal direction of the oven.

Alternatively, the apparatus for moving bricks into a coke oven comprises an in-oven beam fixed to ceiling hanging hardware installed through eyeholes formed in the combustion chamber ceiling of the oven, an ex-oven beam extending from the in-oven beam to the outside of the oven, a suspension device for lifting up and down a suspended load and moving along the in-oven beam and the ex-oven beam, and a brick gripping device suspended from the suspension device. When laying bricks in the repaired portion near the oven opening of the coke oven, the hoist beam having a length extended to the outside of the coke oven is fixed to the lower ends of the ceiling hanging hardware for supporting the ceilig of the combustion chamber in the repaired portion. A large-weight load can be easily taken from the outside into the inside of the oven by using the hoist beam. Further, because the hoist beam is separable into an ex-oven beam and an in-oven beam, the ex-oven beam being positioned so as not to interfere with any other traveling car or machine traveling outside the coke oven along the oven end. As one concrete means for realizing such a hoist beam, the apparatus may further comprise a hinge structure for coupling the in-oven beam and the ex-oven beam to each other at a position corresponding to the end of the combustion chamber of the coke oven, the hinge structure being able to selectively hold each or both of the beams in bent or straight conditions. The hinge structure enables the in-oven beam and the ex-oven beam to be coupled linearly to provide the hoist beam extending to the outside of the oven when used, and enables the in-oven beam to be folded into the oven when not used. As another concrete means for realizing such a hoist beam, the apparatus may further comprise a mutually connecting fixture for coupling the in-oven beam and the ex-oven beam to each other at a position corresponding to the end of the combustion chamber of the coke oven, the ex-oven beam being mounted on a traveling carriage. Additionally, the brick gripping device may comprise a gripper for gripping a refractory at both side surfaces thereof, the refractory being formed in the same shape as a part of the combustion chamber of the coke oven in the repaired portion, and fixing means for bringing the gripper into pressure contact with both the side surfaces of the refractory.

Preferred embodiments of the present invention will be described below with reference the drawings.

Figure 3:
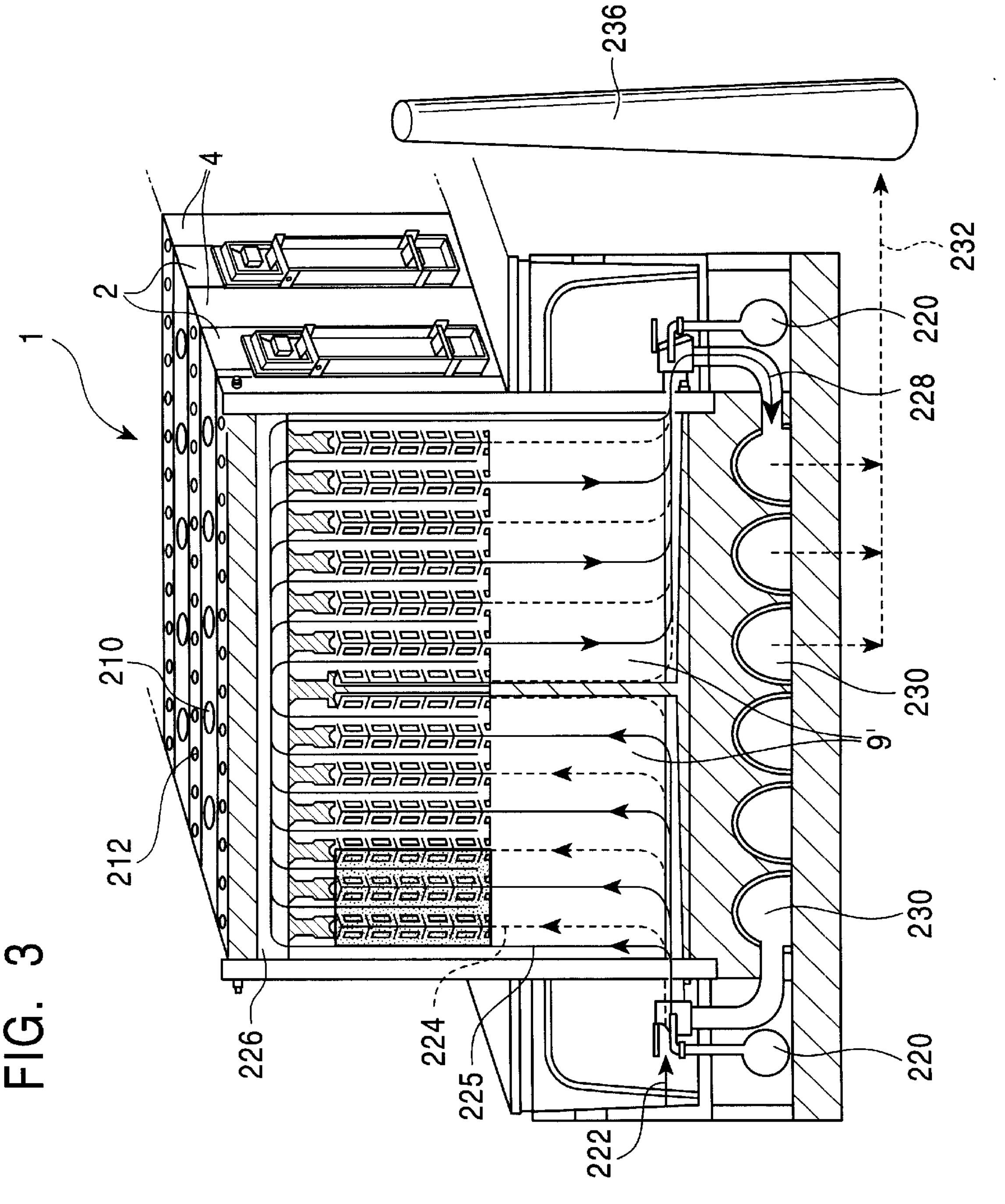
FIG. 3 is an explanatory perspective sectional view of a part of a chamber type coke oven to which the present invention is applied, showing gas flows in a regenerator and a combustion chamber.

FIG. 3 is a schematic perspective sectional view of a part of a coke oven having a top horizontal flue, to which the present invention applies. In the coke oven, coking chambers 2 for carbonizing coal and combustion chambers 4 for burning fuel gas 225 are alternately arranged side by side. The fuel gas 225 supplied from a fuel gas pipe 220 and air 222 taken in from the outside are introduced to each combustion chamber 4 for burning in it. The combustion chamber 4 has vertical passages each provided with a number of blowoff ports for the fuel gas and air. Combustion gas rises in one half section of the combustion chamber 4 while heating a wall, and then falls in the other half section of the combustion chamber 4 after passing a top horizontal flue 226. The wall of the combustion chamber 4 functions as a partition between the adjacent coking chambers 2. Heat of combustion conducts through the wall of the combustion chamber 4 and contributes to carbonizing coal. Exhaust gas 228 is discharged from a smokestack 236 through a regenerator 9, small flues 230, and a large flue 232. The fuel gas pipe 220 is provided one on each of the opposite sides of the coke oven 1. The two fuel gas pipes 220 on both sides are switched over for selective use at certain time intervals so that the direction of flow of the combustion gas is reversed cyclically. The regenerator 9 recovers waste heat of the exhaust gas 228, and utilizes the recovered heat for heating the fuel gas 225 and the air 222 for the next cycle. Coal charging holes 210 and eyeholes 212 for viewing the interior of the combustion chambers are formed in the ceiling of the coke oven 1.

As one embodiment, a hot relay or repair of opening-end 4-flues was conducted in a multistage combustion type coke oven having a height of 6 m and a top horizontal flue. The term A opening-end 4-flues@ means a portion of the combustion chamber which includes four vertical flues near the oven opening end and is indicated by a dotted area in FIG. 3.

In the past, the brick wall of the combustion chamber had been formed by laying 38 stages of bricks from a bottom level of the adjacent coking chambers to a level of the upper end of the top horizontal flue. Of the 38 stages of bricks, a portion defining the vertical passage in the combustion chamber had been built by laying small-sized bricks. In this embodiment, large-sized bricks each having a height corresponding to two stages of the conventional small-sized bricks were employed, and a refractory assembly was formed by laying the large-sized bricks in two or three stages. The use of the refractory assembly enabled a brick wall corresponding to 4–6 stages of the conventional small-sized bricks to be built at a time. further. by using the large-sized bricks also to build a manually laid portion of the brick wall, the time required for the overall repairing process was shortened.

Figure 4:
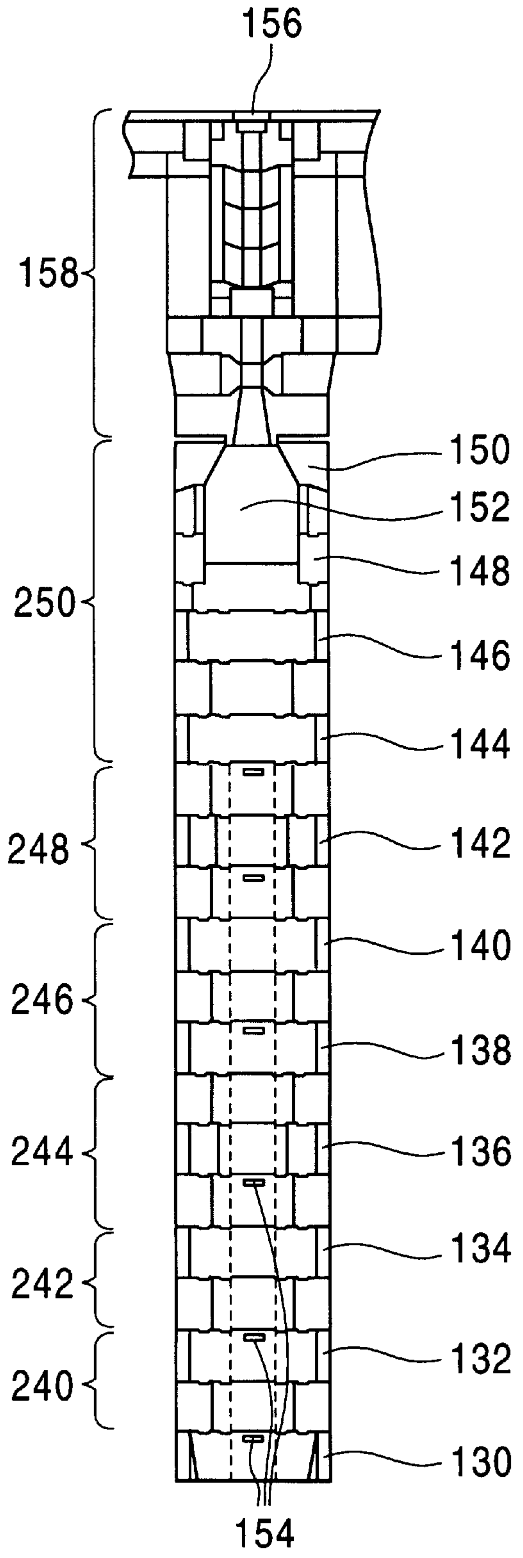
FIG. 4 is a sectional view showing an entire wall of the combustion chamber rebuilt by hot repair as viewed from the oven opening end.

FIG. 4 is a sectional view showing the entire wall of the combustion chamber rebuilt by hot repair according to the embodiment, as viewed from the oven opening end of the coke oven. The combustion chamber is formed by laying a first stage brick 130, a third stage brick 132, a fifth stage brick 134, a seventh stage brick 136, a ninth stage brick 138, an eleventh stage brick 140, a thirteenth stage brick 142, a fifteenth stage brick 144, a seventeenth stage brick 146, a nineteenth stage brick 148, and a twenty-first stage brick 150 at alternate positions in the vertical direction. Also, a plurality of fuel gas/air ports 154 are formed to be open to the vertical passage. At the top of the combustion chamber, a horizontal flue 152 is formed. An eyehole 156 for viewing the interior of the combustion chamber is formed to penetrate the ceiling 158.

Figure 5:
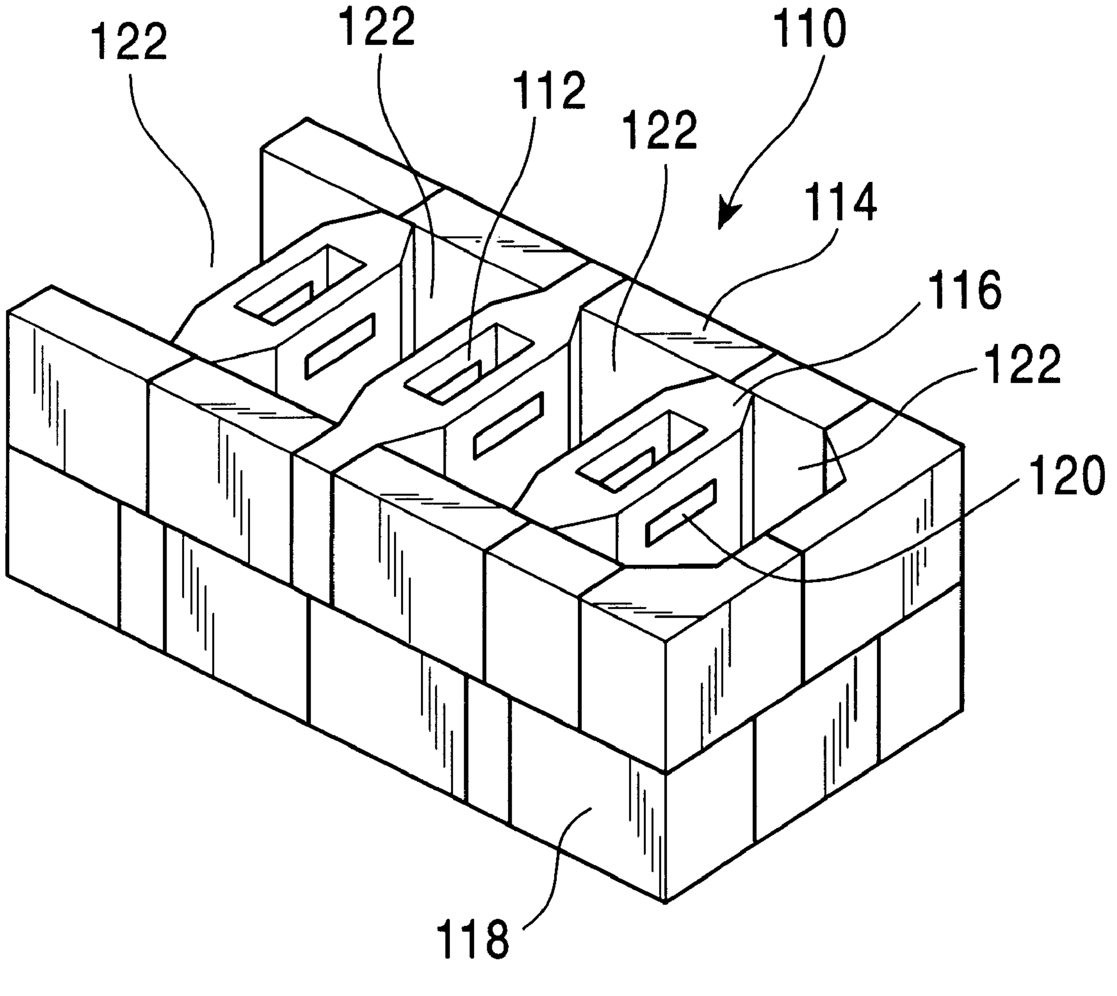
FIG. 5 is a perspective view of a refractory assembly according to an embodiment of the present invention.

FIG. 5 is a perspective view showing one example of a refractory assembly 110 used in the repair work. The refractory assembly 110 is constructed of a combination of many refractory unit members such as Binder bricks 116, Laufer bricks 114, and front bricks 118. The Binder bricks 116 each have a fuel gas/air passage 112 and ejection ports 120 serving as burning nozzles and formed to be open to vertical flues 122.

The process of the repair work is described below.

(a) First, the dimensions of a wall portion to be dismantled and the three-dimensional features, such as torsion and inclination, of the remaining wall portion of the combustion chamber were measured. The wall portion to be repaired was divided into a plurality of layers stacked one above another, and the shape and dimensions of a refractory assembly coincided with each of the stacked layers. The refractory assemblies were employed to build second to fourteenth stages, counting from the lowermost stage, of the combustion chamber constructed of 21 stages of refractories (large-sized bricks) from the bottom level to the level of the top horizontal flue, and were sized to have a height corresponding to two or three stages of the large-sized bricks. Incidentally, the size of the refractory assembly is restricted depending on the ability of an apparatus for transporting the refractory assembly from a site outside the oven where the refractory assembly is manufactured, to a position in front of the oven where the brick wall is rebuilt, and the ability of an apparatus moving horizontally and vertically to take the refractory assembly from the position in front of the oven into the oven. Also, the vertical range of the brick wall in which the refractory assembly can be employed is determined depending on the size and working range of the apparatus moving vertically inside the oven.

(b) The refractory assemblies were then manufactured outside the oven. Two types of refractory assemblies were manufactured by combining many unit refractories with each other, one type (shown in FIG. 5) having a height corresponding to two stages of the large-sized bricks and the other type (not shown) having a height corresponding to three stages of the large-sized bricks. Total five refractory assemblies were used as shown in FIG. 4 such that, viewing from the bottom level, a first refractory assembly 240 constitutes the second and third stages, a second refractory assembly 242 constitutes fourth and fifth stages, a third refractory assembly 244 constitutes sixth to eighth stages, a fourth refractory assembly 246 constitutes ninth to tenth stages, and a fifth refractory assembly 248 constitutes twelfth to fourteenth stages.

(c) The first to fifth refractory assemblies were moved into the oven to build the repaired portion.

(d) After the first to fifth refractory assemblies were completely stacked, the fifteenth to twenty-first stages of bricks 250 were manually stacked.

Figure 6:
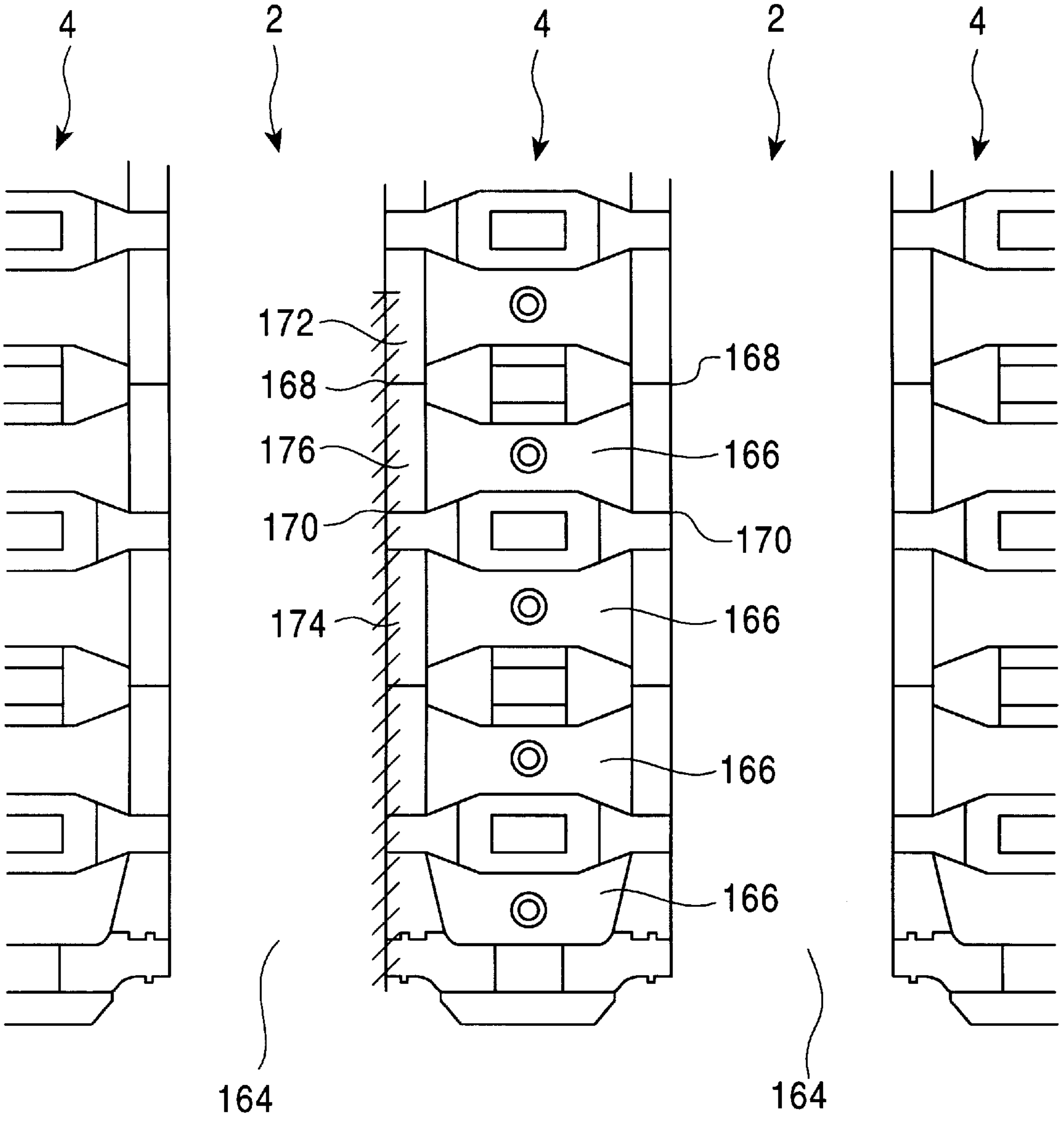
FIG. 6 is a horizontal sectional view of brick walls of a Carl Still coke oven near oven openings, the view showing the embodiment of the present invention.
Figure 7:
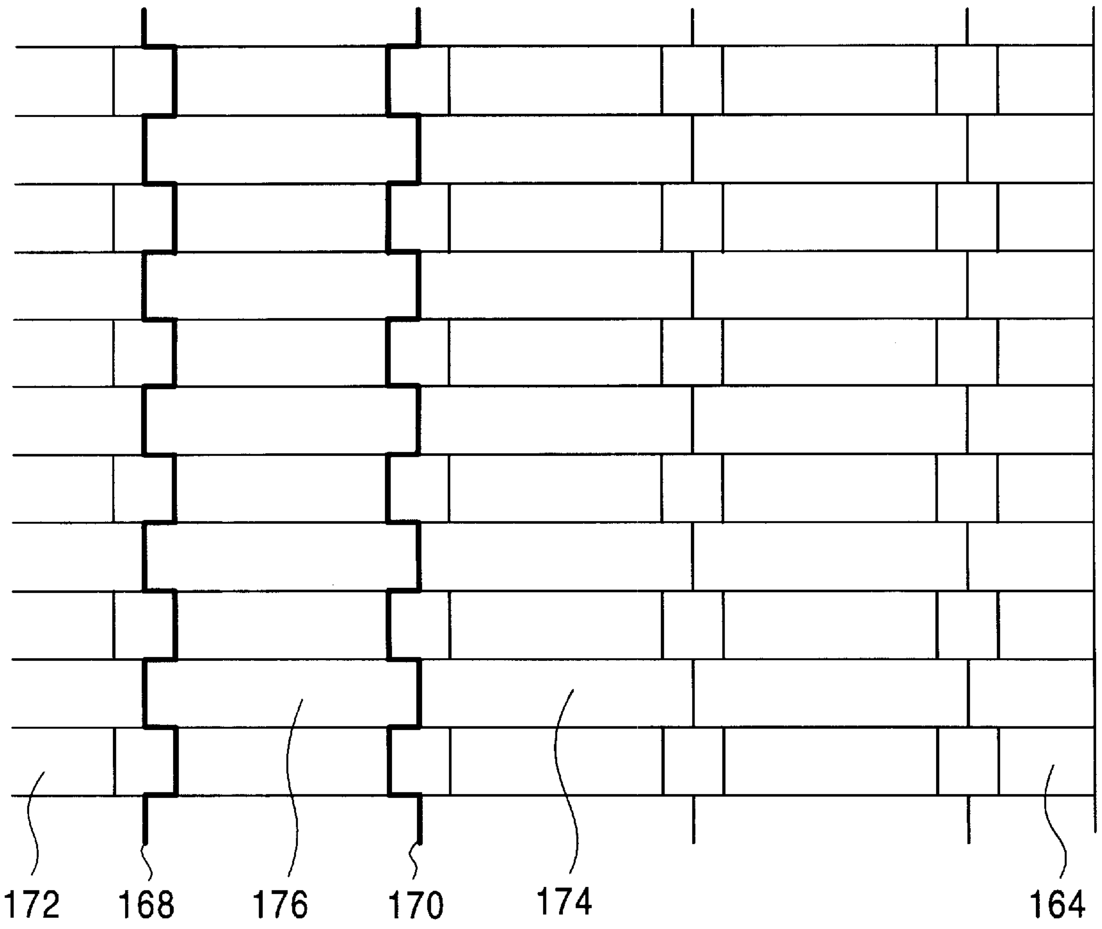
FIG. 7 is a side view of the brick wall near the oven opening before dismantling.
Figure 8:
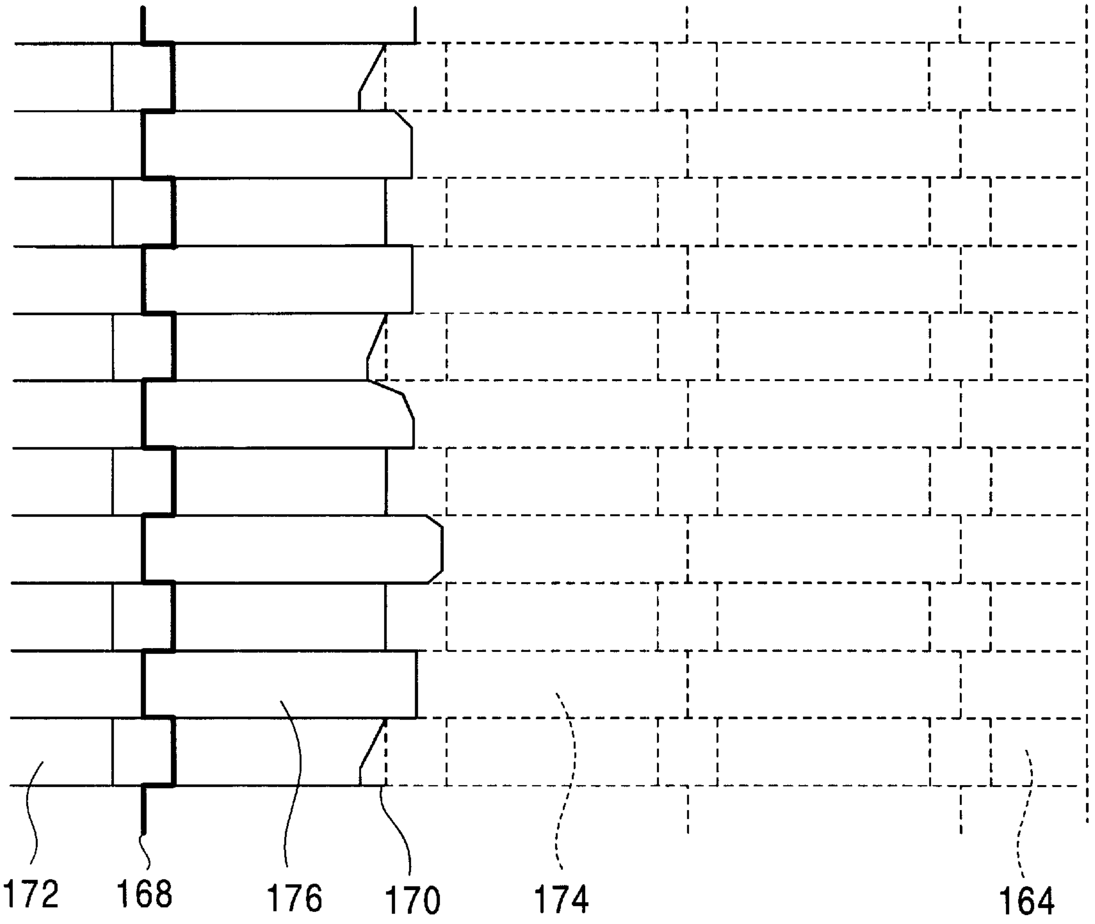
FIG. 8 is a side view of the brick wall near the oven opening during dismantling.
Figure 9:
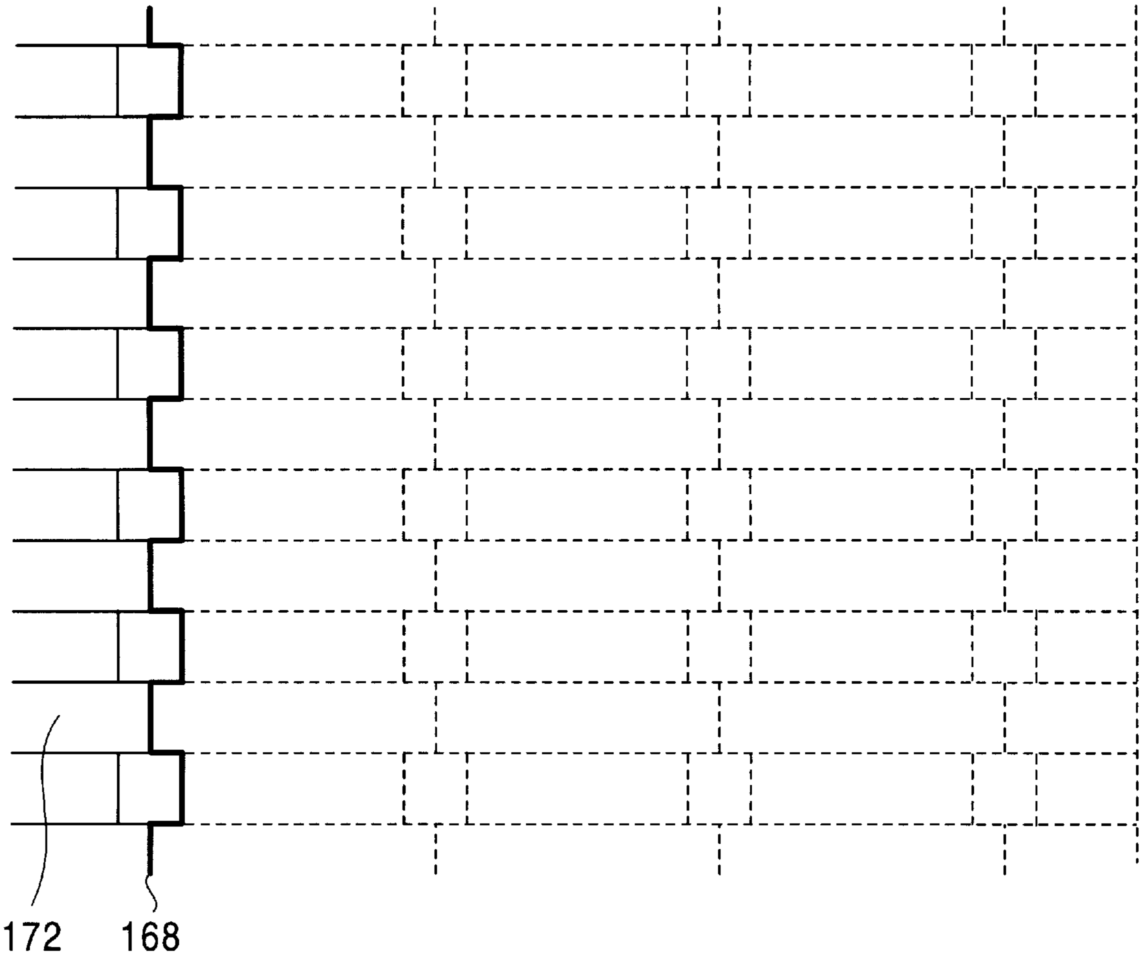
FIG. 9 is a side view of the brick wall near the oven opening after the completion of dismantling.

Dismantling of the oven wall according to the present invention is shown in FIGS. 6 to 9. FIG. 6 is a horizontal sectional view of brick walls of a Carl Still coke oven near the oven openings, the view showing an embodiment of the present invention. FIG. 7 is a side view of the brick wall near the oven opening before dismantling, FIG. 8 is a side view of the brick wall near the oven opening during dismantling, and FIG. 9 is a side view of the brick wall near the oven opening after the completion of dismantling. A hatched area in FIG. 6 corresponds to a dismantled portion of the brick wall shown in the side views of FIGS. 7 to 9, and dismantled bricks are indicated by dotted lines in FIGS. 8 and 9.

As shown in FIG. 6, the combustion chambers 4 and the coking chambers 2 are alternately arranged in adjacent relation. Outer wall surfaces of each combustion chamber 4 serve as wall surfaces of the coking chambers 2; namely, a brick wall structured to form the combustion chamber 4 also functions as a partition between the adjacent coking chambers 2. A brick relaid area (rebuilt portion) was selected to range from an oven opening 164 to a new/old-brick adjoining boundary 168, i.e., selected to a wall portion including four vertical flues 166. For dismantling the rebuilt portion, as shown in FIGS. 6 and 7, a cut was first scored by a cutter along joints 170 locating one brick forward of target joints defining the new/old-brick adjoining boundary 168. Then, bricks 174 locating from the oven opening 164 to the cut joints 170 were dismantled using an air pick. Vibrations and impacts generated in-that step were mitigated at the cut position (i.e., the position of the joints 170). At this stage, therefore, the bricks were dismantled until the position of the joints 170 cut by the cutter or near the cut position as shown in FIG. 8, whereas bricks 172 in a not-rebuilt portion were not subjected to any cracks.

Subsequently, bricks 176 in the remaining wall of the rebuilt portion were carefully dismantled using a cutter, a hammer and a chisel until the new/old-brick adjoining boundary 168. On that occasion, because workers can insert their hands into the combustion chamber, the brick dismantling work can be performed in a safe and careful manner. As a result, as shown in FIG. 9, a superior new/old-brick adjoining boundary 168 can be attained.

While the above description is made in connection with the embodiment in which a Carl Still coke oven is rebuilt, the present invention can also be easily applied to any other type of coke oven.

Figure 10:
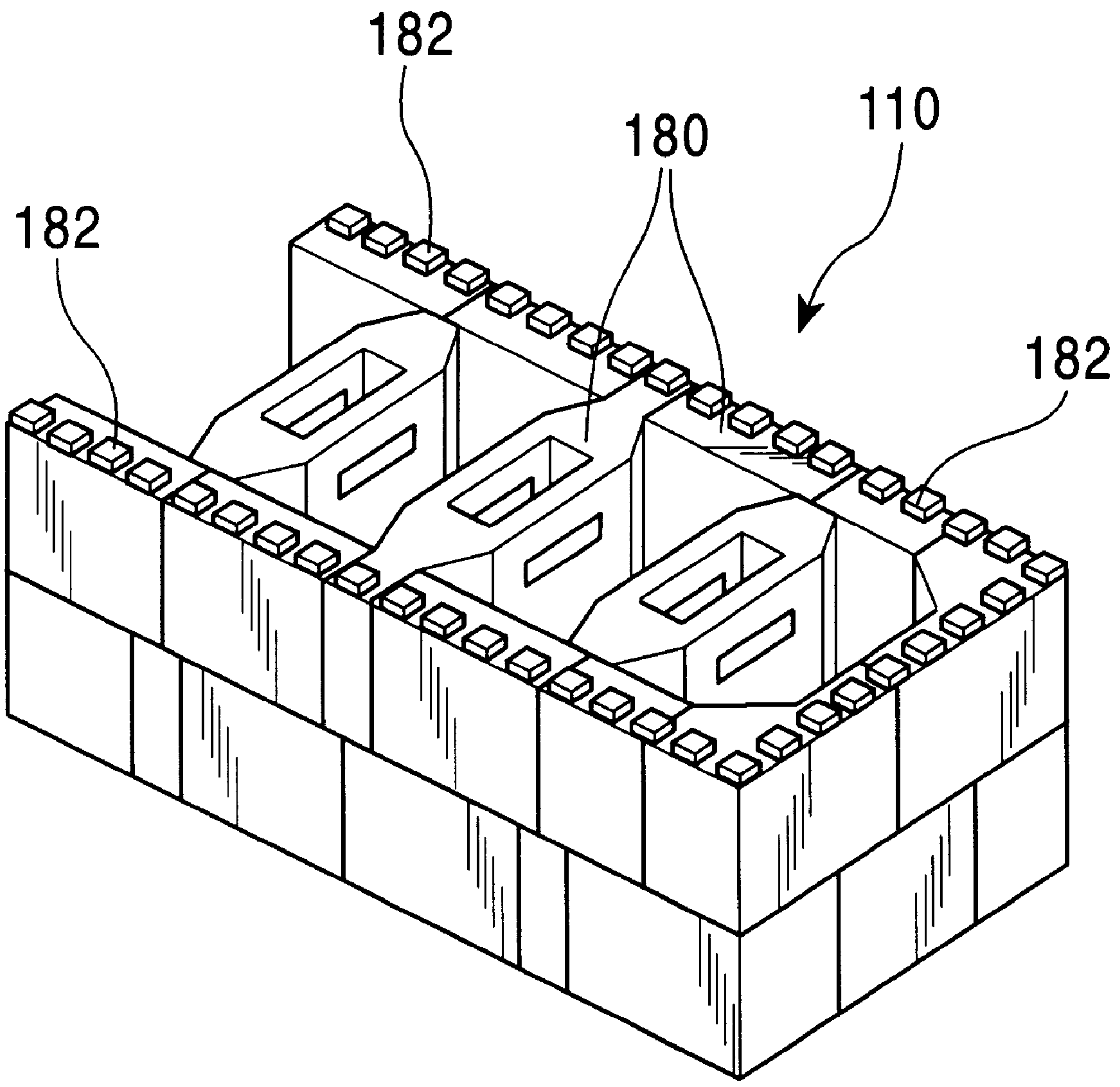
FIG. 10 is an explanatory view for explaining a manner of stacking the refractory assemblies with a joint applied between them.

An embodiment of a manner of stacking the refractory assemblies with a horizontal joint applied between them, according to the present invention, will be described below. FIG. 10 is an explanatory view for explaining a manner of stacking a refractory assembly with the joint applied between them. FIG. 10 shows a lower-stage refractory assembly 110 on which is laid an upper-stage refractory assembly. After the upper-stage refractory assembly has been carried into the oven and positioned with respect to the lower-stage refractory assembly, mortar prepared to have a relatively large consistency was applied onto a mounting surface 180 of the lower-stage refractory assembly, and spacers 182 were disposed along an outer periphery of the mounting surface 180. The spacers 182 were each made of a piece of machined wood. The spacers 182 can be made of any suitable material so long as it is sufficiently durable against the pressure imposed from the bricks of the upper-stage refractory assembly laid thereon without swelling or losing strength upon absorption of moisture For example, wood subjected to waterproof treatment, a metal, a brick having the same material as the bricks used for building the wall, etc. can be employed as the material of the spacers 182. After arranging a selected number of spacers 182 machined to have the same thickness as a predetermined one of the joint, the upper-stage refractory assembly was precisely laid on the lower-stage refractory assembly in the previously confirmed position under fine adjustment. The use of the spacers 182 prevented the mortar from shrinking due to depression applied when the upper-stage refractory assembly was precisely laid, and from hardening during the work of stacking the upper-stage refractory assembly. It was therefore possible to securely obtain the predetermined joint thickness and the bonding strength of the mortar. Further, continuous laying of the bricks, i.e., the refractory assembly, was enabled The spacers 182 were withdrawn after about one hour from installation of the upper-stage refractory assembly, allowing the weight of the upper-stage refractory assembly to impose upon the joint. The spacers 182 may be withdrawn at the stage in which the mortar is about half dried to such an extent as developing the strength to support the load applied due to the weight of the refractory assembly. Incidentally, the spacers may be left there when a brick having the same material as the bricks used for building the wall is employed and the mortar is spread so as to fully surround the entire periphery of each spacer.

A battery of coke-oven combustion chambers was built by repeating the work of laying the refractory assemblies several times in the above-described manner. The dimensional accuracy of the completed brick structure was maintained as per design. The rebuilt wall of the combustion chamber was employed in the oven after the repair and after extended use still continues operation with superior performance.

With the above embodiment, since the refractory assemblies can be easily and precisely manufactured, the working time in the oven was shortened and the working environment of the workers was greatly improved. Also, since the refractory assemblies were manufactured to match with the dimensions and shapes of the dismantled portion and the remaining portion of the brick wall, oven wall surfaces free from uneven steps were formed and an increase in the frictional resistance generated at the time of pushing coke out of the oven was suppressed Further, since a necessary number of spacers were disposed on the lower-stage refractory assembly before laying the upper-stage refractory assembly on it, it was possible to hold an appropriate thickness of the joint between them even in the case of installing a large-weight refractory assembly, and to maintain the dimension accuracy of the brick built-up structure.

Figure 11:
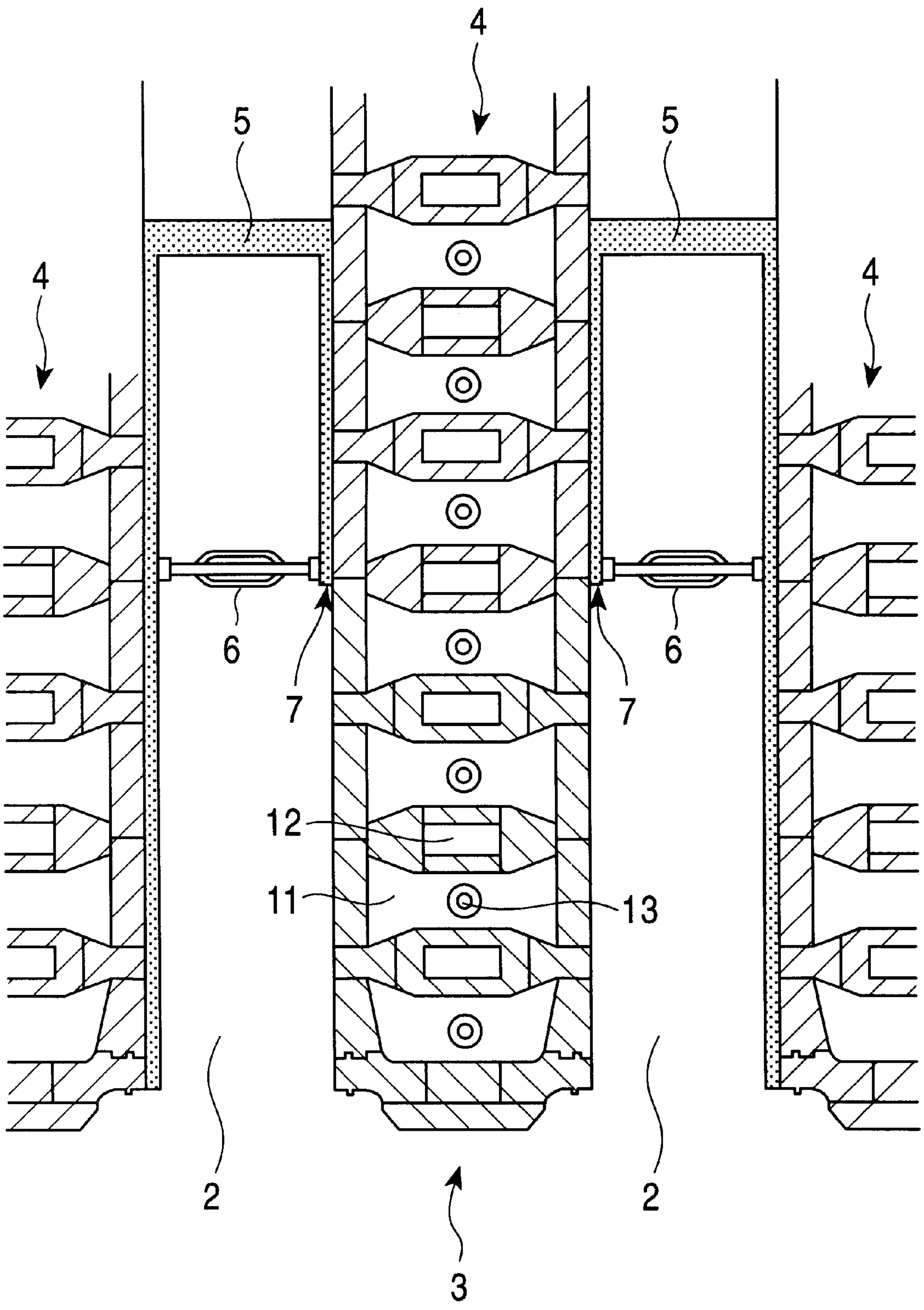
FIG. 11 is a partial plan sectional view showing a structure of the coke oven in a state that a repaired portion of the brick wall is covered for heat insulation.

A method of heat-insulating a part of a coke oven during repair of a brick wall therein, according to the present invention, will now be described with reference to the drawings. FIG. 11 is a partial plan sectional view showing a structure to be repaired. A plurality of coking chambers 2 and combustion chambers 4 are arranged alternately side by side in adjacent relation, thereby constituting an oven battery. It is here assumed that, as shown in FIG. 11, a wall 3 structured to form one of the combustion chambers 4 is repaired and only a portion of the wall 3 nearer to the oven opening than a rebuilt/unrebuilt portion boundary 7 is rebuilt. After emptying two adjacent coking chambers 2, heat-insulating materials 5 are installed to cover outer wall surfaces of the target combustion chamber 4 which face the coking chambers 2 and extend inward over two or three vertical flues 11 from the rebuilt/unrebuilt portion boundary 7 in the wall 3 to be rebuilt, transverse sections of the coking chambers 2 locating inward two or three vertical flues 11 from the rebuilt/unrebuilt portion boundary 7, and outer wall surfaces of two adjacent combustion chambers which extend from the rebuilt/not-rebuilt portion boundary 7 to the oven openings. The heat-insulating materials 5 are tightened by fastening fixtures 6 to be held close contact against the wall surfaces to block off streams of heat, followed by cooling bricks in the rebuilt portion. The combustion chamber 4 is made up of passages 12 for fuel gas or air, and vertical flues 11 through which heated gas flows. Bottom gas ports 13 are located at the bottom ends of the vertical flues 11. The bottom gas ports 13 are covered by fitting lids to prevent brick scraps from entering the ports 13.

Figure 12A:
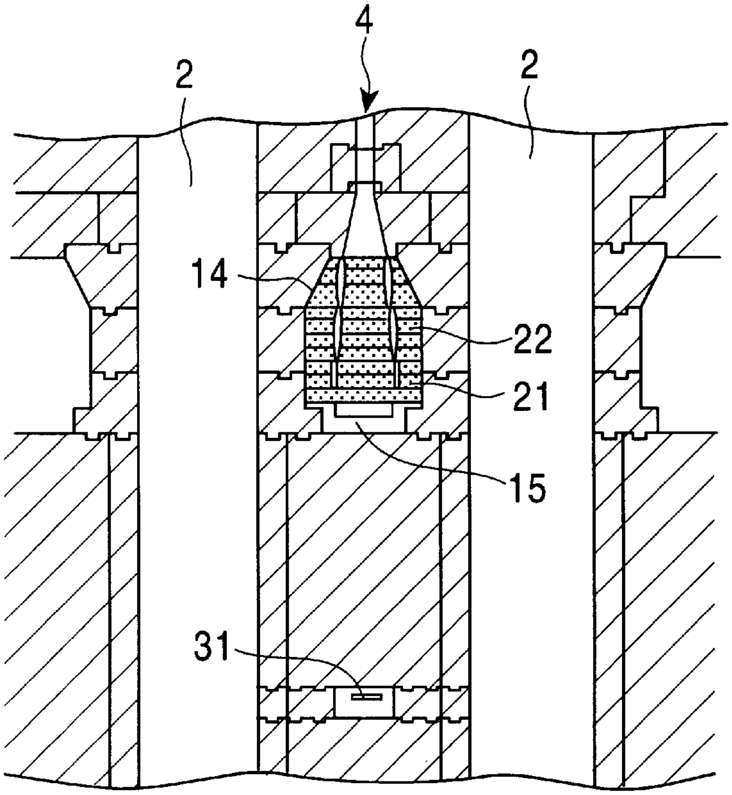
FIG. 12A is a front view and FIG. 12B is a side view, both the views showing an enclosed horizontal flue.
Figure 12B:
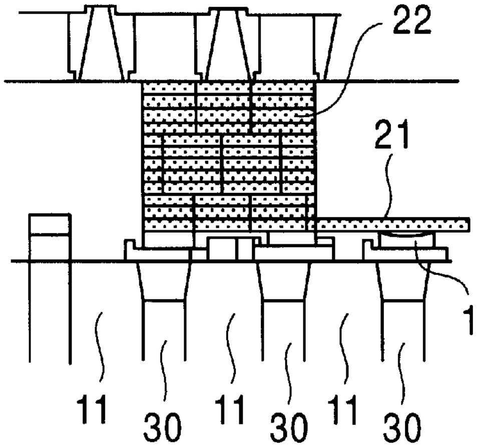
Figure 13A:
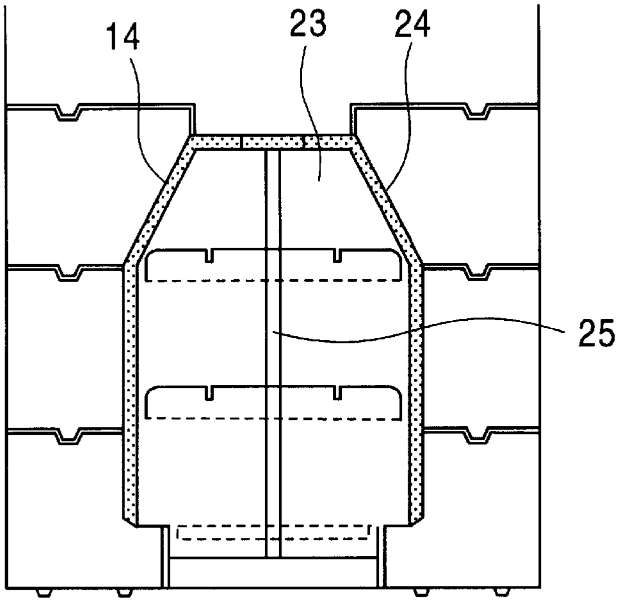
FIG. 13A is a front view and FIG. 13B is a side view, both the views showing a block plate installed in the horizontal flue.

FIG. 12A is a front view and FIG. 12B is a side sectional view, both the views showing a horizontal flue 14 in an enclosed condition. FIG. 13A is a front view and FIG. 13B is a side view, both the views showing a state in which a block plate 23, such as single or more-leaf screen, is vertically installed in the horizontal flue 14.

Referring to FIGS. 12A and 12B, a heat-insulating board or blanket 21 is horizontally placed in the horizontal flue 14 to cover two or three vertical flues 11 in the unrepaired portion adjacent to the repaired portion, thereby cutting off communication between the horizontal flue 14 and those vertical flues 11. By placing the heat-insulating blanket 21 after moving a slide brick 15 disposed near the top of each vertical flue 11 to close an upper opening of vertical flue, the disconnection between both the horizontal flue 14 and the vertical flues 11 can be made more surely. A plurality of heat-insulating blankets 22 are filled in the horizontal flue 14 at the end of the not-repaired portion to perfectly block off the horizontal flue 14 at a position adjacent to the boundary between the repaired portion and the not-repaired portion.

Figure 13B:
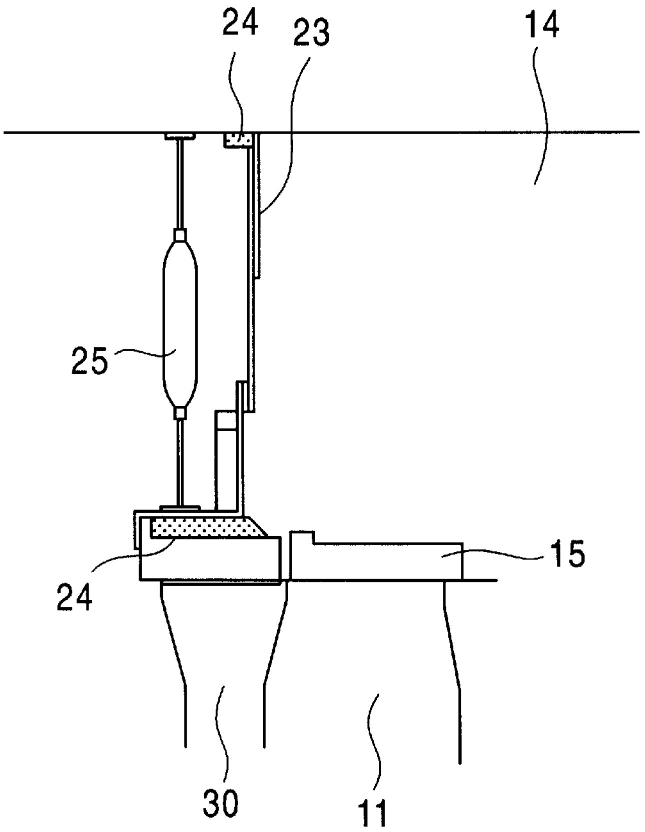

More positive heat cutoff in the horizontal flue 14 can be obtained by providing additional means shown in FIGS. 13A and 13B, i.e., by vertically mounting the block plate 23, such as a double or more-leaf screen, along a surface of the heat-insulating blankets 22 adjacent to the repaired portion, and filling a heat-insulating material 24 around the block plate 23.

Figure 14A:
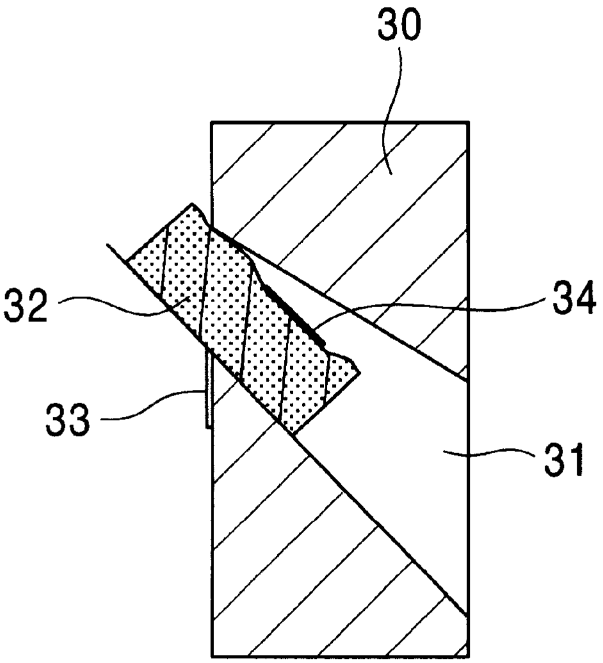
FIG. 14A is an explanatory views for explaining a manner of closing a port.
Figure 14B:
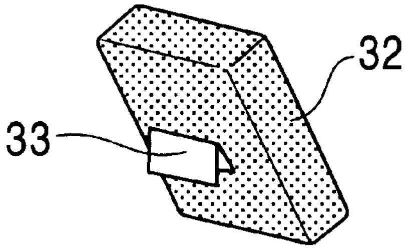
FIG. 14B is a perspective view of a heat-insulating material.

Gas ports or air ports 31 are formed in multiple stages to penetrate partitions 30 defining the passages 12 for fuel gas or air and the vertical flues 11. FIG. 14A is an explanatory view showing a state in which the gas ports or air ports 31 formed in the partition 30 are blocked off by a heat-insulating material 32, and FIG. 14B is a perspective view of the heat-insulating material 32.

Immediately before starting to dismantle the bricks or during the dismantling work, the gas ports or air ports 31 formed in the partition 30 between one vertical flue on the repaired portion side and another vertical flue on the unrepaired portion side adjacent to the former are all blocked off by the heat-insulating materials 32 to perfectly cut off flows of hot air from the vertical flue on the repaired portion side to the not-repaired portion side. Reinforcing plates 33, 34 for reinforcing the heat-insulating material 32 are also shown in FIG. 14.

Figure 15:
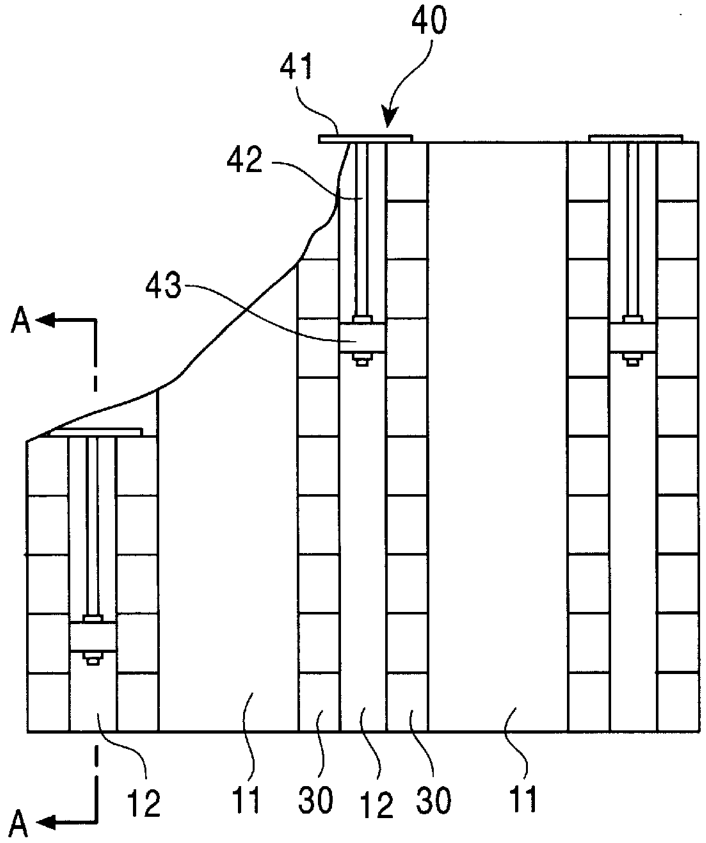
FIG. 15 is an explanatory view showing a depending lid used when the brick wall is dismantled.
Figure 16:
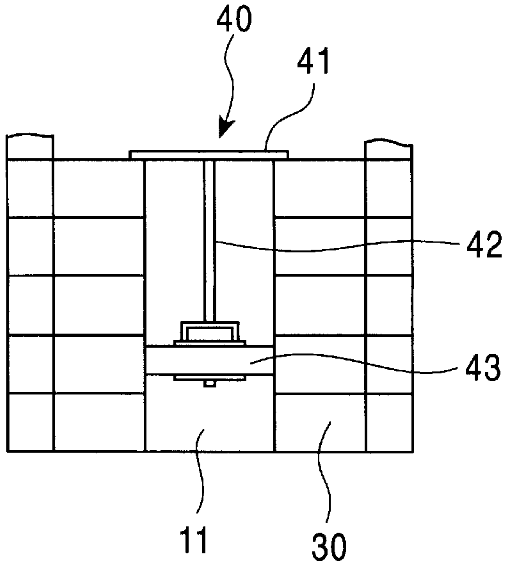
FIG. 16 is a view taken along line A—A in FIG. 15 as viewed in the direction of the arrow.

FIG. 15 shows a situation during the work of dismantling the brick wall of the combustion chamber successively from the wall upper end at the oven opening. FIG. 16 is a view taken along line A—A in FIG. 15 as viewed in the direction of arrow. As the work of dismantling the partitions 30, which constitute the brick wall of the combustion chamber, progresses from the wall upper end at the oven opening, a multistage burner duct 12 serving as the passage for fuel gas or air is exposed one by one. When the multistage burner duct 12 is exposed, a depending lid 40 is suspended in the multistage burner duct 12 from the upper end of the multistage burner duct 12 to close the duct opening. As shown in FIGS. 15 and 16, the depending lid 40 may comprise a heat-insulating plug 43, a flange 41, and a rod 42 coupling the plug 43 and the flange 41 to each other. The depending lid 40 can be made of any suitable material that is endurable against high temperatures, such as steel or refractory. Different materials may be used for each unit of the depending lid 40. The heat-insulating plug 43 is sized to substantially cover al inner space of the multistage burner duct 12 so that when brick scraps are dropped into the multistage burner duct 12 during the dismantling work, they are prevented from falling dour until the bottom duct port. The flange 41 is sized to be slightly larger than a horizontal section of the multistage burner duct 12 so that the heat-insulating plug 43 is surely suspended in the duct. The length of the rod 42 may be selected to a size corresponding to the height of two or several stages of bricks.

As shown in FIGS. 15 and 16, brick scraps generated during the dismantling of the partitions 30 are blocked by the flange 41 and the heat-insulating plug 43 of the depending lid 40, and are prevented from falling down to the bottom of the multistage burner duct 12. In this connection, because of the rod 42 having the length corresponding to the height of two or several stages of bricks, even when the partitions 30 at the top of which the depending lid 40 is disposed are dismantled, brick scraps can be prevented from falling down into the multistage burner duct 12. Also, since the depending lid 40 serves to block off ejection of high-temperature gas, safety of the dismantling work can be maintained.

With the above embodiment, in the work of relaying bricks in a Carl Still coke oven, heat insulation is satisfactorily achieved at the boundary between the repaired portion and the unrepaired portion to block off streams of heat, and therefore the dismantling work can be performed with safety. Further, cooling of surfaces of the remaining oven walls can be avoided, and the burner duct bricks can be prevented from cracking or tilting.

Figure 17:
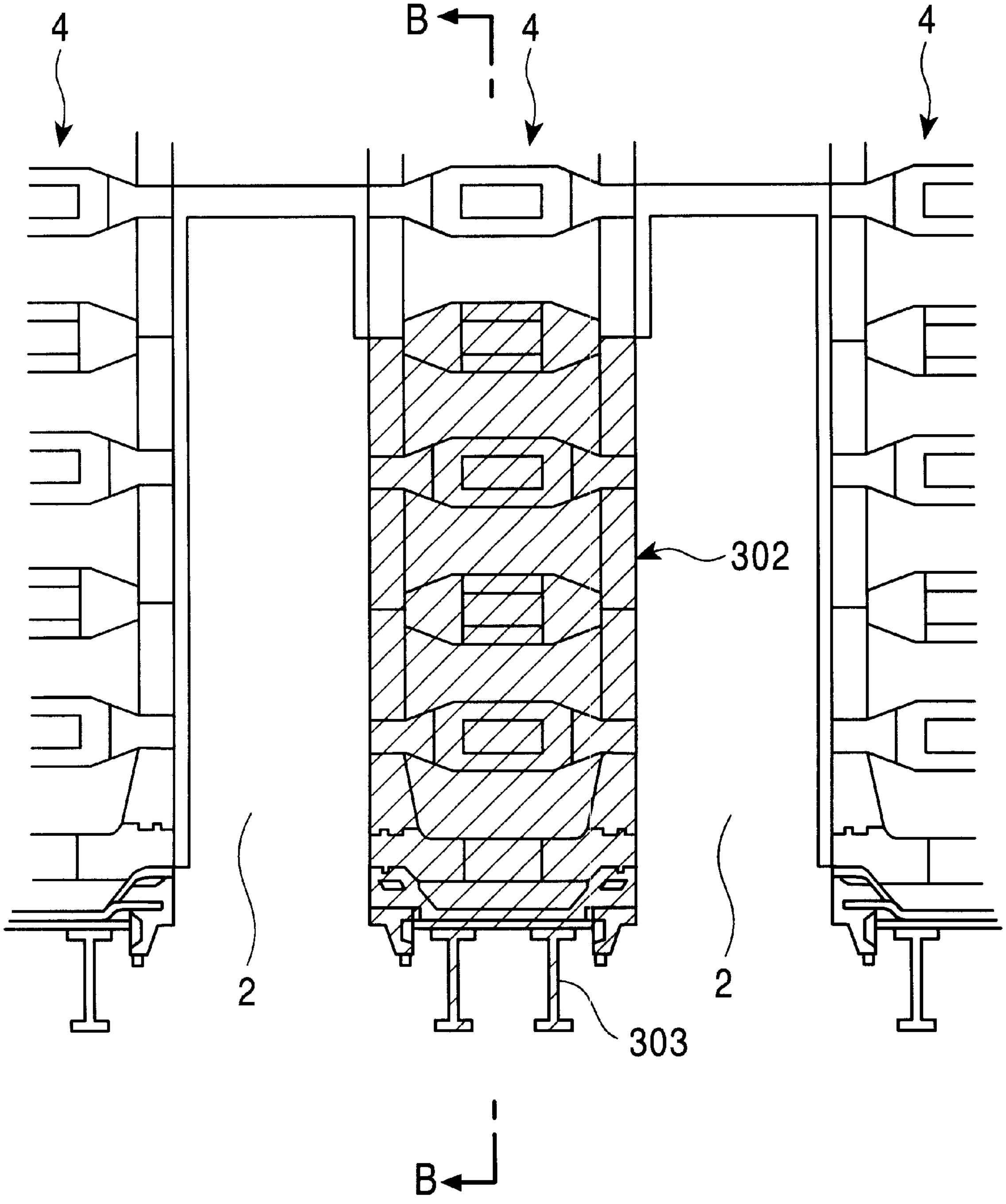
FIG. 17 is a horizontal sectional view of a part of the coke oven.
Figure 18:
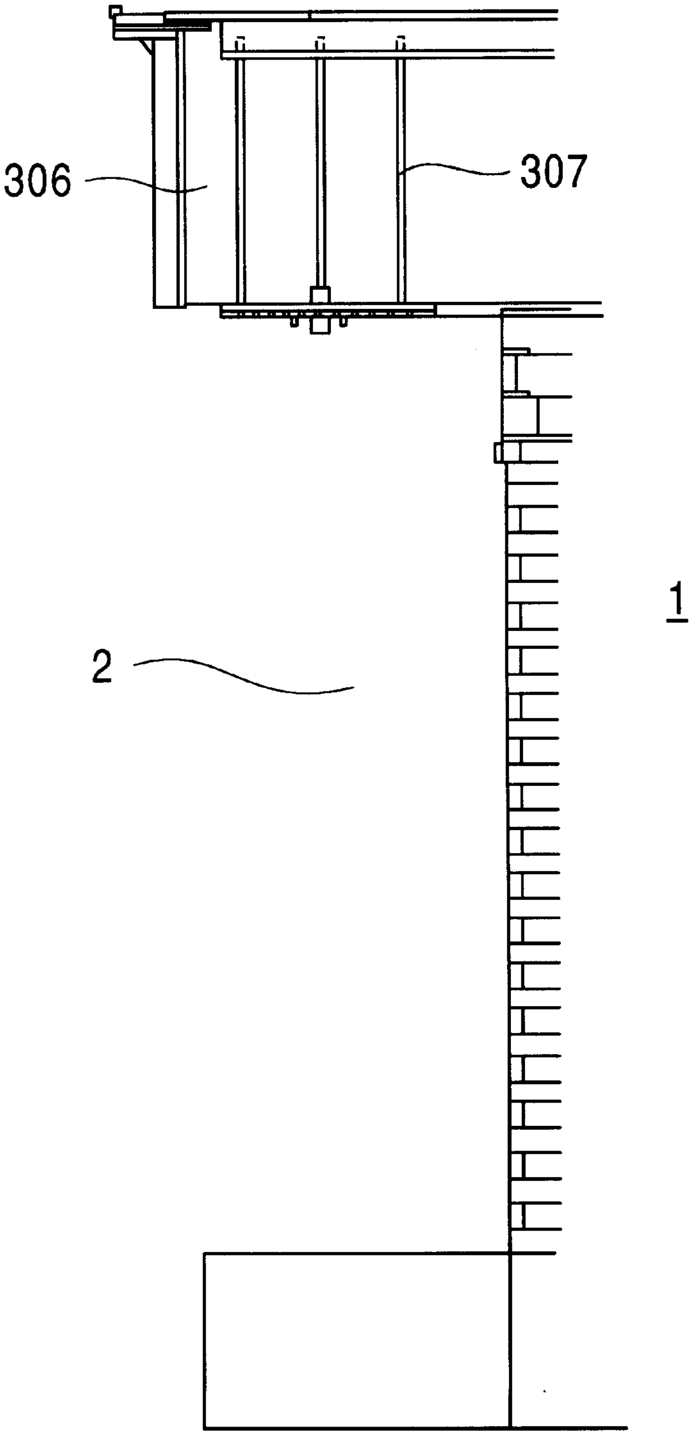
FIG. 18 is a view take along the line B—B in FIG. 17 as viewed in the direction of the arrow.

Embodiments of an apparatus for moving bricks into a coke oven, according to the present invention, will be described below with reference to the drawings. FIG, 17 is a horizontal sectional view of a part of a coke oven in which coking chambers 2 and combustion chambers 4 are arranged alternately side by side in adjacent relation. In FIG. 17, the hatched area represents a rebuilt portion 302 near the oven opening in which bricks are relaid, and oven fastening hardware 303 to be replaced. FIG. 18 is a side sectional view taken along line B—B in FIG. 17 as viewed in the direction of arrow. FIG. 18 shows a condition in which wall bricks in the rebuilding portion have been removed and the ceiling 306 of the combustion chamber is supported with hanging rods 307 inserted through the eyeholes formed in the ceiling 306.

Figure 19:
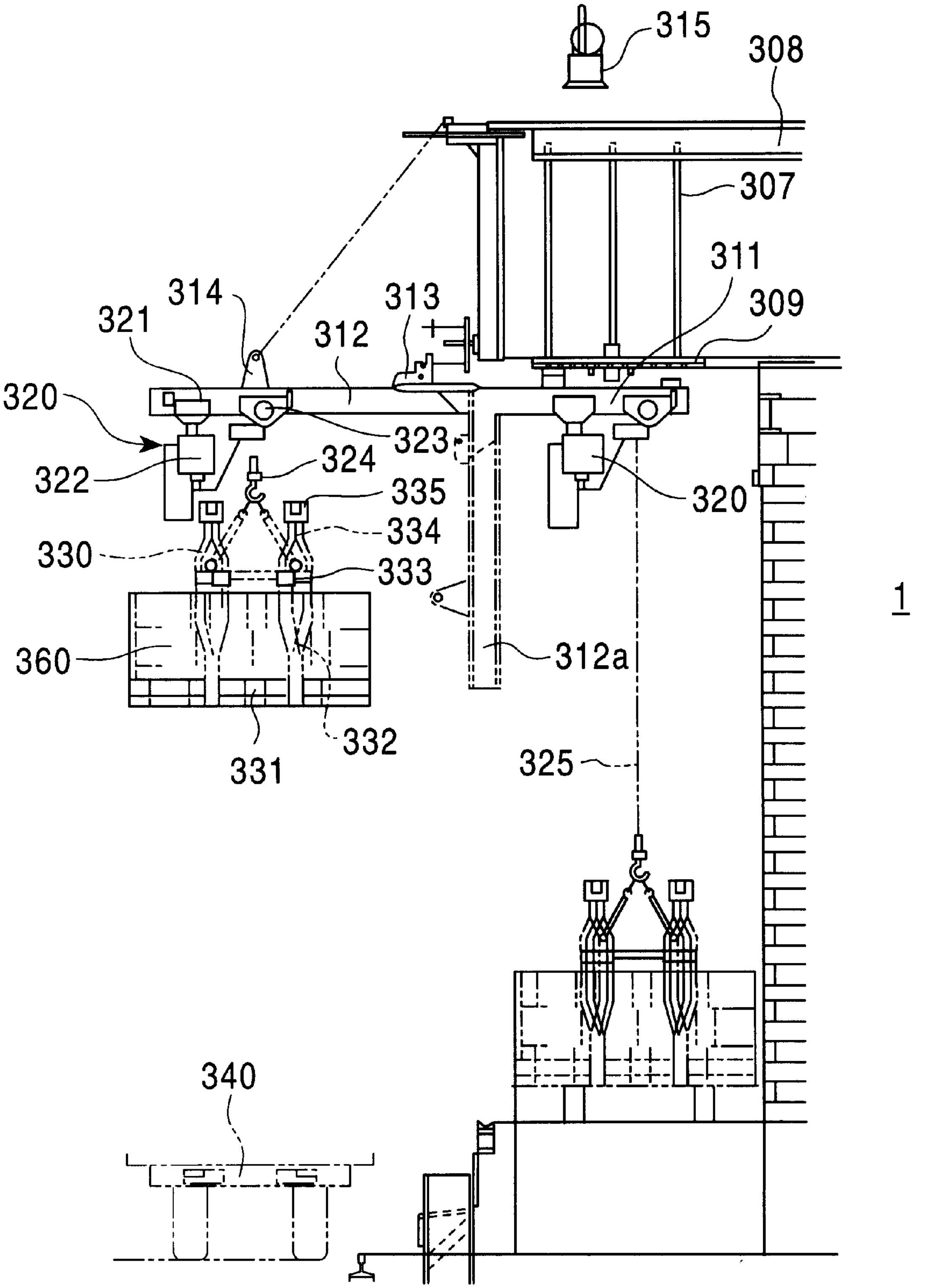
FIG. 19 is a side view of a repaired portion of the coke oven, showing a brick taking-in apparatus according to one embodiment.
Figure 20:
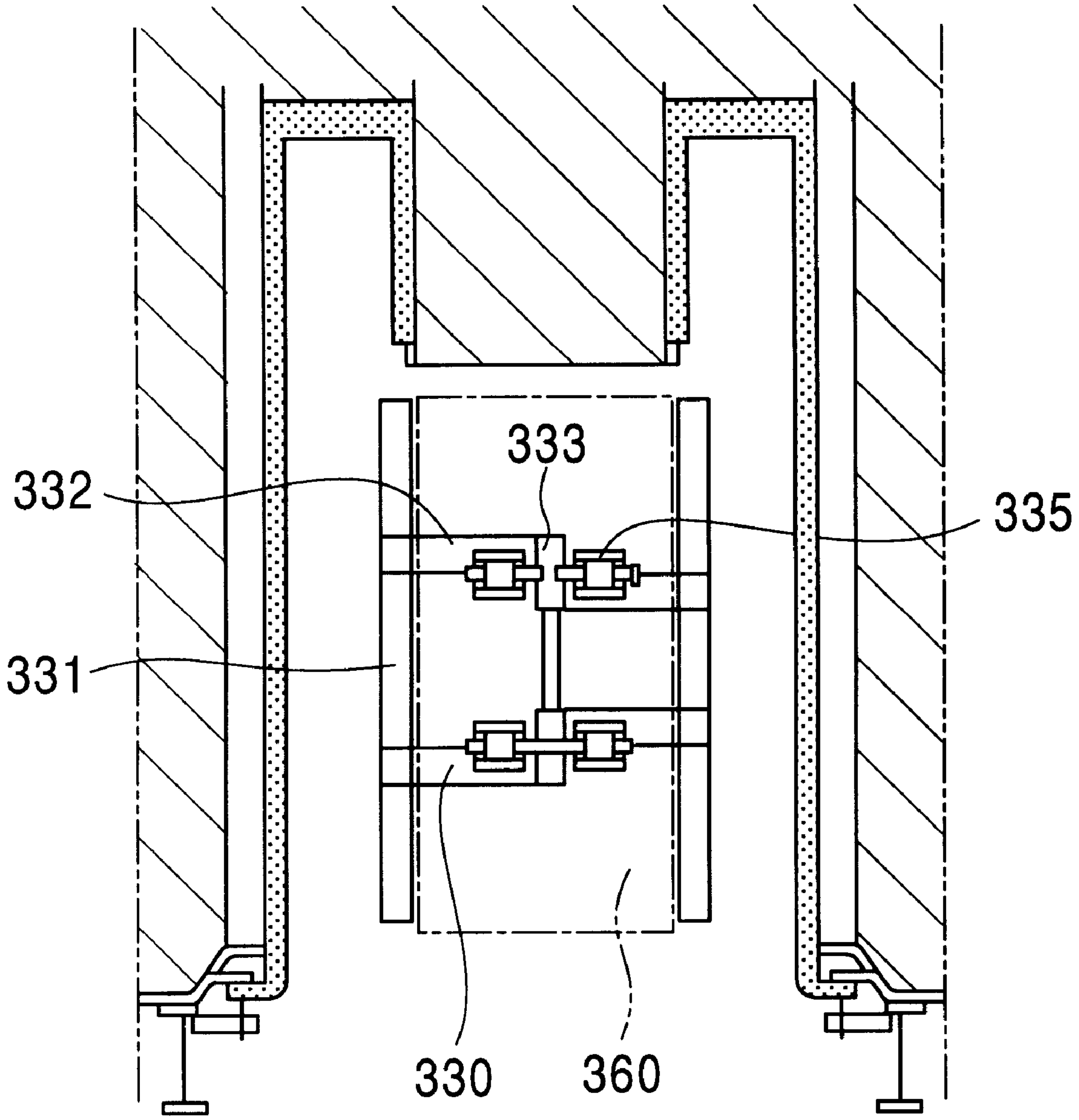
FIG. 20 is a plan view of the repaired portion shown in FIG. 19, including the brick taking-in apparatus.

FIG. 19 is a side view of the being-repaired portion of a coke oven, showing the apparatus for moving bricks into the repaired portion near the oven opening according to one embodiment of the present invention, and FIG. 20 is a front view of the repaired portion. As shown in FIG. 19, a hoist beam comprising an in-oven beam 311 and an ex-oven beam 312 is provided, and the in-oven beam 311 is attached to the lower ends of the ceiling banging rods 307. The ceiling hanging rods 307 are hung from a beam 308 mounted at the top of the oven, and have ceiling hanging fixtures 309 attached to their lower ends. The in oven beam 311 is coupled to two or more of the ceiling hanging fixtures 309 for positive connection to the beam 30 mounted at the top of the oven from the standpoint of dynamics The in-oven beam 311 and the ex-oven beam 312 are coupled to each other at a position corresponding to the end of the combustion chamber of the coke oven 1 through a hinge structure 313 capable of selectively holding both the beams in a bent or straight condition. When a large-weight load (such as a brick or a refractory assembly) is taken from the outside into the inside of the oven by using the ex-oven beam 312, the in-oven beam 311 and the ex-oven beam 312 are connected linearly with axes of both the beams aligned with each other, and serve as a single beam. Such a condition can be achieved, for example, bar lifting up a bracket 314 attached to the ex-oven beam 312 at a position near the beam fore end by a lifting apparatus 315 Also, the ex-oven beam 312 can be bent at the hinge structure to assume a depending condition indicated by 312*a* so that traveling of a car traveling outside the oven is not interfered by the projection ex-oven beam 312.

A suspension device 320 lifts up and down a suspended load 360 and is movable along the in-oven beam 311 and the ex-oven beam 312. The suspension device 320 comprises a traveling unit 321 traveling along the hoist beam, a winch 322, a sheave 323, a suspending hook 324, and a wire rope 325.

For lifting a brick load carried as the suspended load 360 to a position below the hoist beam by a canying car 340, the suspension device 320 includes a brick gripping device 330. The brick gripping device 330 includes gripper for gripping a refractory (suspended load 360) at both side surfaces thereof which is formed in the same shape as a part of the combustion chamber of the coke oven. In the embodiment shown in FIGS. 19 and 20, the brick gripping device 330 comprises pressure contact plates 331 brought into pressure contact with both the side surfaces of the suspended load 360, arms 332 for opening or closing the pressure contact plates 331, pins 333 about which the arms 332 are pivotable to open or close, and expanding/-contracting devices 335 for expanding or contracting the upper ends of extensions 334 of the arms 332. These components cooperatively constitute a fixing means for bringing the gripper into pressure contact with both the side surfaces of the refractory.

Figure 21:
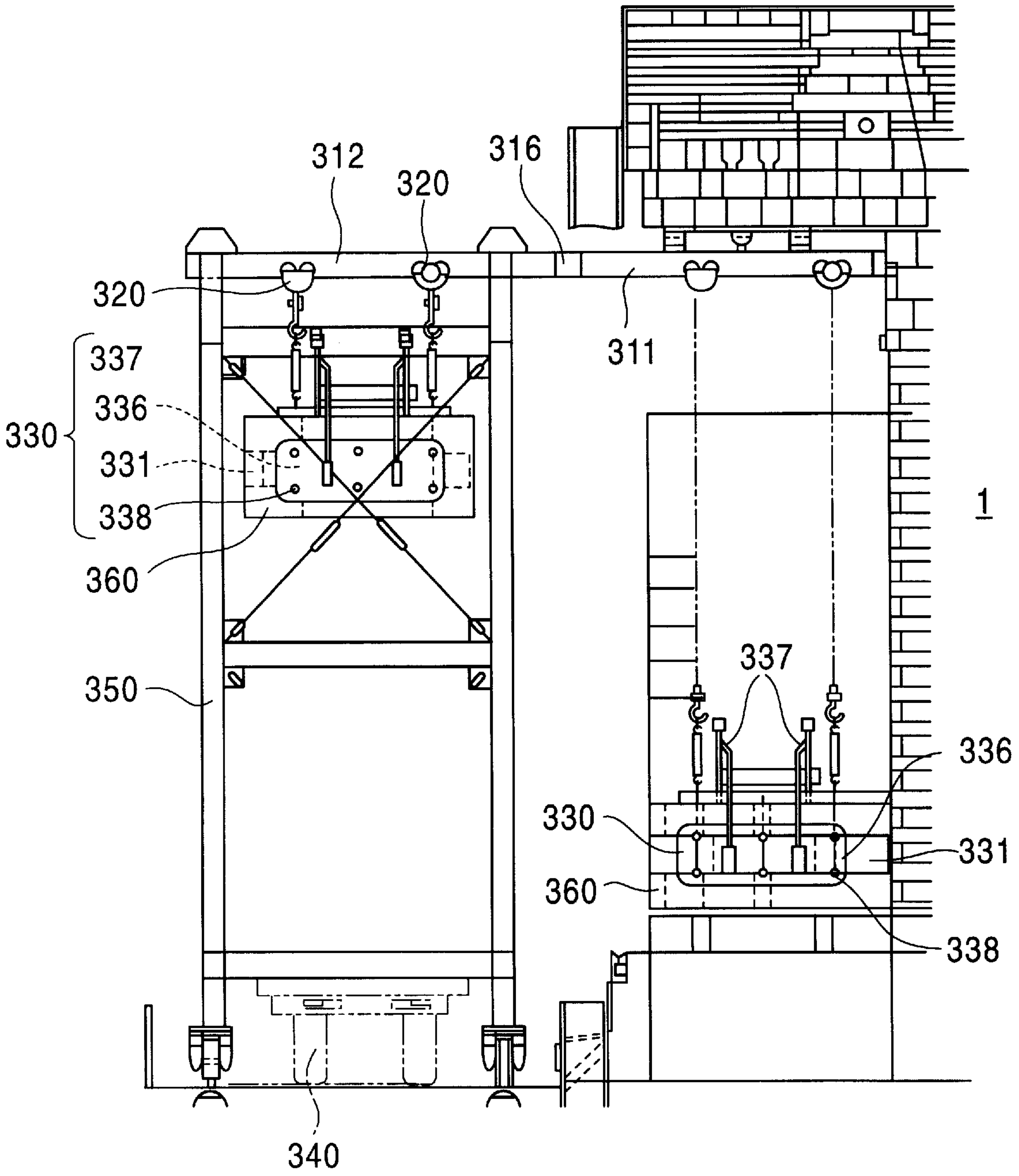
FIG. 21 is a side view of the repaired portion of the coke oven, showing a brick taking-in apparatus according to another embodiment.
Figure 22:
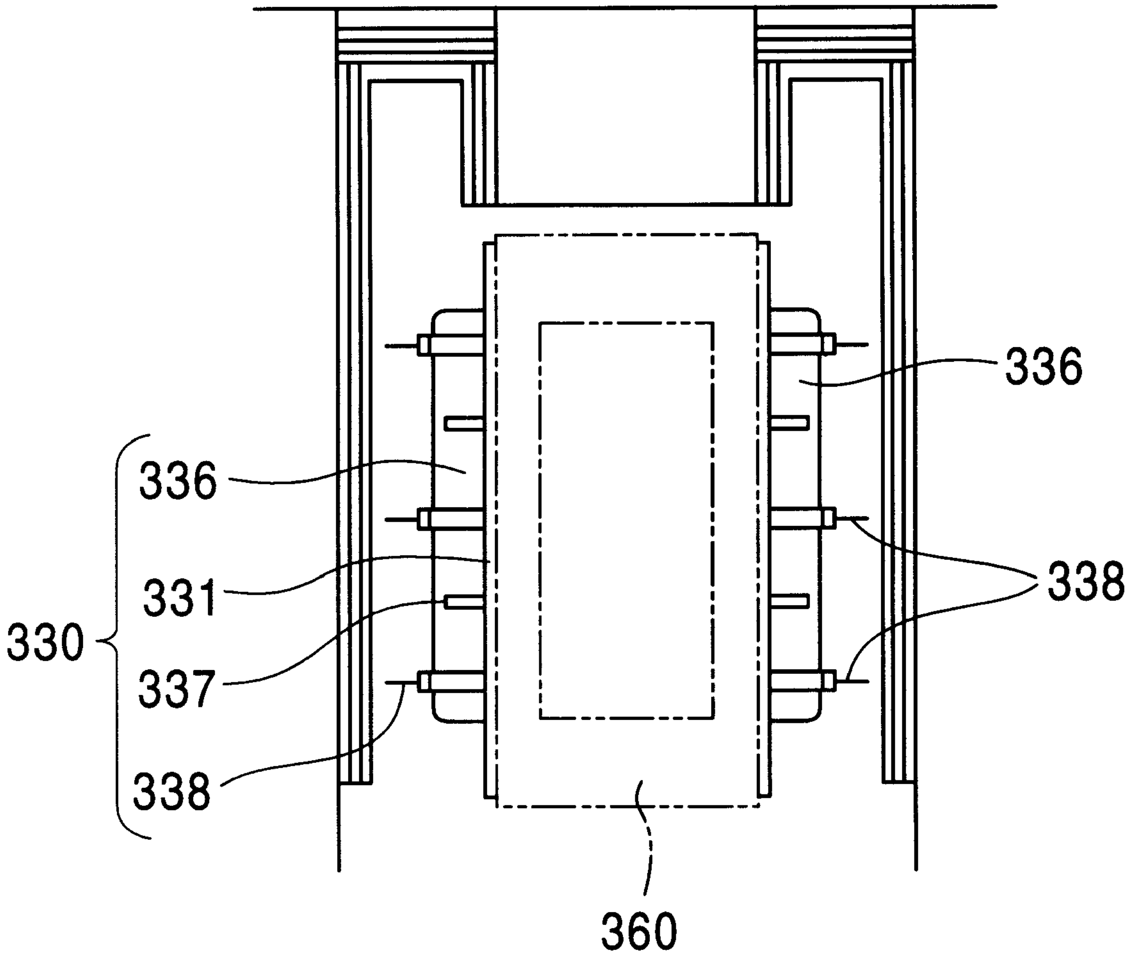
FIG. 22 is a plan view of the repaired portion shown in FIG. 21, including the brick taking-in apparatus.

Another embodiment of the apparatus for moving bricks into the coke oven is shown in FIGS. 21 and 22. FIG. 21 is aside view of the repaired portion of the coke oven, including a brick taking-in apparatus, and FIG. 22 is a plan view of the repaired portion shown in FIG. 21. In this embodiment, an ex-oven beam 312 to be coupled to an in-oven beam 311 is mounted on a traveling carriage 350. The traveling carriage 350 is able to travel along the oven end in the transverse direction of the oven. When the traveling carriage 350 reaches a beam coupling position, the ex-oven beam 312 is coupled to the in-oven beam 311. The coupling between the ex-oven beam 312 and the in-oven beam 311 can be made, for example, with a mutually connecting fixture 316 of the male and female fitting type. A suspension device 320 on the traveling carriage 350 lifts up a suspended load 360 from a carrying car 340, travels along the ex-oven beam 312 and the in-oven beam 311, and then lifts down the suspended load 360 in the coke oven 1. In this embodiment, a brick gripping device 330 comprises pressure contact plates 331 brought into pressure contact with both the side surfaces of the suspended load 360, backup plates 336, a gate-shaped fitting 337 for connecting the backup plates 336 to tightly press the pressure contact plates 331 against both side surfaces of the suspended load 360.

With the above embodiments of the brick taking-in apparatus, when relaying bricks in the rebuilt portion near the oven opening of the coke oven and replacing the oven fastening hardware, since the hoist beam having a length extending outside the oven is provided at the lower ends of the ceiling hanging hardware to support the ceiling in the rebuilt portion, a large-weight load can be easily moved from the outside into the inside of the oven. Also, the hoist beam is separable into the ex-oven beam extending outside the oven and the in-oven beam locating inside the oven, and the ex-oven beam is foldable to the inside of the oven or mounted on the traveling carriage. Therefore, the hoist bean can be surely prevented from interfering with other traveling car or machine traveling outside the oven. Furhter, since the apparatus includes the brick ripping device for gripping a large-sized brick, the large-sized brick can be easily lifted up and down and laid in place.

According to the present invention, coke oven walls deformed in various ways due to the use for many years can be precisely repaired with high efficiency. More particularly, even in the case of repairing a coke oven of the type having a complicated structure, it is possible to significantly shorten the working time under high temperatures, to greatly reduce the load of brick relaying work, and to precisely repair damaged brick walls. As a result, the productivity of the coke oven can be radically increased and the oven life can be very significantly prolonged.

What is claimed is:

1. A method of repairing a damaged portion of a coke oven combustion chamber multi-layer brick wall, comprising:

heat-insulating the wall portion to form a repair space in said combustion chamber of said coke oven and provide access to said wall portion, said wall portion comprising a plurality of wall layers stacked one above another and formed from a plurality of bricks, determining the sizes, shapes and arrangements of said bricks of one or more damaged wall layers for removal from said damaged wall portion, dismantling said bricks from said wall portion and removing said bricks from said repair space, separately and outside said oven assembling a plurality of bricks to form a shaped refractory assembly having bricks in a size, shape and arrangement corresponding to said determined sizes, shapes and arrangements of said wall portion removed, moving said refractory assembly from outside said chamber to inside said chamber in a position in said repair space corresponding to the position of said removed damaged wall portion, and joining said refractory assembly to said brick wall.

2. A method according to claim 1, wherein plural refractory assemblies are formed to have shapes in coincidence with said stacked layers of said repaired brick wall in one-to-one relation.

3. A method according to claim 2, wherein spacers are arranged at joints between said refractory assemblies stacked one above another, and the refractory assembly of an upper stage is laid on a joint, including said spacers, applied to the refractory assembly of a lower stage.

4. A method according to claim 2, wherein said refractory assemblies are formed into shapes in coincidence with main portions of said stacked layers of said repaired brick wall in one-to-one relation.

5. A method according to claim 1, wherein said coke oven is of the 2-division type having a horizontal flue at the top of a combustion chamber, and wherein said oven has a repair space which is heat-insulated by closing upper end openings of two or more vertical flues with a heat-insulating material, said vertical flues being located in an unrepaired portion adjacent to the repaired portion, and by blocking off said horizontal flue over a fill cross section.

6. A method according to claim 1, wherein said coke oven is of the 2-division type having a horizontal flue at the top of a combustion chamber, and said oven having a repair space which is heat-insulated by blocking off gas ports and air ports with heat-insulating materials, said gas ports and air ports being formed in a partition of a vertical flue adjacent to the repaired portion.

7. A method according to claim 1, wherein said coke oven is of the 2-division type having a horizontal flue at the top of a combustion chamber, and said oven having the repair space which is heat-insulated by placing a depending lid from above into each of passages for fuel gas and air, said passages being exposed with progress of work for dismantling said brick wall in said repaired portion.

8. A method of repairing a part of a combustion chamber brick wall of a coke oven, comprising the steps of:

heat-insulating a repair space in said oven;

dividing a brick wall in a portion to be repaired into a plurality of layers stacked one above another;

dismantling and removing said brick wall in said to be repaired portion;

manufacturing refractory assemblies outside said oven by combining a plurality of bricks together to form a shape corresponding to each of said stacked layers in a one-to-one relationship;

carrying said refractory assemblies into said oven one by one using an apparatus comprising i) an in-oven beam fixed to ceiling hanging hardware installed through eyeholes formed in the combustion chamber ceiling of said oven, ii) an ex-oven beam extending from said in-oven beam to the outside of said oven, iii) a suspension device for lifting up and down a suspended load and moving along said in-oven beam and said ex-oven beam, and iv) a brick gripping device suspended from said suspension device; and building said brick wall in said to be repaired portion with said refractory assemblies.

9. A method according to claim 8, wherein said apparatus for taking bricks into said oven includes a hinge structure connected for coupling said in-oven beam and said ex-oven beam to each other at a position corresponding to the end of a combustion chamber of said coke oven, said hinge structure being alternatively connected to selectively hold both said beams in a bent or straight condition.

10. A method according to claim 8, wherein said apparatus for taking bricks into said oven includes a mutually connecting fixture for coupling said in-oven beam and said ex-oven beam to each other at a position corresponding to the end of a combustion chamber of said coke oven, said ex-oven beam being mounted on a carriage traveling along an oven end in the transverse direction of said oven.

11. A method according to claim 8, wherein said brick gripping device of said apparatus for taking bricks into said oven includes a gripper for gripping a refractory at both side surfaces thereof, said refractory being formed in the same shape as a part of a combustion chamber of said coke oven, and fixing means for bringing said gripper into pressure contact with both, the side surfaces of said refractory.

12. A method of repairing a part of a combustion chamber brick wall of a coke oven, wherein said coke oven is of the two-divided type having a horizontal flue at the top of a combustion chamber, said method comprising steps of:

heat-insulating a repair space in said oven by installing heat-insulating materials to cover outer wall surfaces of said combustion chamber over a distance corresponding to two or three vertical flues in an unrepaired portion adjacent to a to be repaired portion, and then further extending said heat-insulating materials to cover areas ranging from inward ends of said heat-insulating materials in the longitudinal direction of the oven to ends of two combustion chambers adjacent to said combustion chamber to be repaired;

diving a brick wall in said portion to be repaired into a plurality of layers stacked one above another;

dismantling and removing the brick wall in said to be repaired portion;

manufacturing each of said refractory assemblies outside said oven by combining a plurality of bricks together to form a shape corresponding to each of said stacked layers in a one-to-one relationship;

carrying said refractory assemblies into said oven one by one; and building the brick wall in said to be repaired portion with said refractory assemblies.

* * * * *